United States Patent
Feero et al.

(10) Patent No.: US 8,285,912 B2
(45) Date of Patent: Oct. 9, 2012

(54) COMMUNICATION INFRASTRUCTURE FOR A DATA PROCESSING APPARATUS AND A METHOD OF OPERATION OF SUCH A COMMUNICATION INFRASTRUCTURE

(75) Inventors: Brett Stanley Feero, Cambridge (GB); Peter Andrew Riocreux, Cheadle (GB); Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 533 days.

(21) Appl. No.: 12/461,345

(22) Filed: Aug. 7, 2009

(65) Prior Publication Data
US 2011/0035523 A1 Feb. 10, 2011

(51) Int. Cl.
*G06F 13/00* (2006.01)
(52) U.S. Cl. .................................. 710/316; 710/317
(58) Field of Classification Search .................. 710/106, 710/110, 113, 114, 241, 316, 317, 51
See application file for complete search history.

(56) References Cited

U.S. PATENT DOCUMENTS

| | | | | |
|---|---|---|---|---|
| 5,703,875 | A * | 12/1997 | Burnett | 370/381 |
| 6,154,462 | A * | 11/2000 | Coden | 370/403 |
| 6,584,121 | B1 * | 6/2003 | Garg et al. | 370/474 |
| 7,013,357 | B2 * | 3/2006 | Murdock et al. | 710/240 |
| 7,051,150 | B2 * | 5/2006 | Naumann et al. | 710/317 |
| 7,145,903 | B2 * | 12/2006 | Gutierrez | 370/362 |
| 7,246,185 | B1 * | 7/2007 | Pritchard et al. | 710/110 |
| 7,266,632 | B2 * | 9/2007 | Dao et al. | 710/317 |
| 2003/0007457 | A1 * | 1/2003 | Farrell et al. | 370/235 |
| 2006/0282588 | A1 * | 12/2006 | Proujansky-Bell | 710/240 |
| 2008/0195782 | A1 * | 8/2008 | Yi | 710/110 |

OTHER PUBLICATIONS

Bertozzi et al., "Xpipers: A Network-on-Chip Architecture for Gigascale Systems-on-Chip", *IEEE Circuits and Systems Magazine*, Second Quarter, 2004, pp. 18-29.
Dally et al., Route Packets, Not Wires: On-Chip Interconnection Networks, IEEE Xplore, Jun. 2001, pp. 684-689.

* cited by examiner

*Primary Examiner* — Khanh Dang
(74) *Attorney, Agent, or Firm* — Nixon & Vanderhye P.C.

(57) ABSTRACT

A communication infrastructure for a data processing apparatus, and a method of operation of such a communication infrastructure are provided. The communication infrastructure provides first and second switching circuits interconnected via a bidirectional link. Both of the switching circuits employ a multi-channel communication protocol, such that for each transaction a communication path is established from an initiating master interface to a target slave interface, with that communication path comprising m channels. The m channels comprise one or more forward channels from the initiating master interface to the target slave interface and one or more reverse channels from the target slave interface to the initiating master interface, and handshaking signals are associated with each of the m channels. The bidirectional link comprises n connection lines, where n is less than m, the bidirectional link supporting a first communication path from the first switching circuit to the second switching circuit and a second communication path in an opposite direction from the second switching circuit to the first switching circuit. Control circuitry is used to multiplex at least one forward channel of the first communication path and at least one reverse channel of the second communication path, with the multiplexing being performed in dependence on the handshaking signals associated with the channels to be multiplexed. This allows the 2m channels formed by the first and second communication paths to be provided by the n connection lines of the bidirectional link.

21 Claims, 17 Drawing Sheets

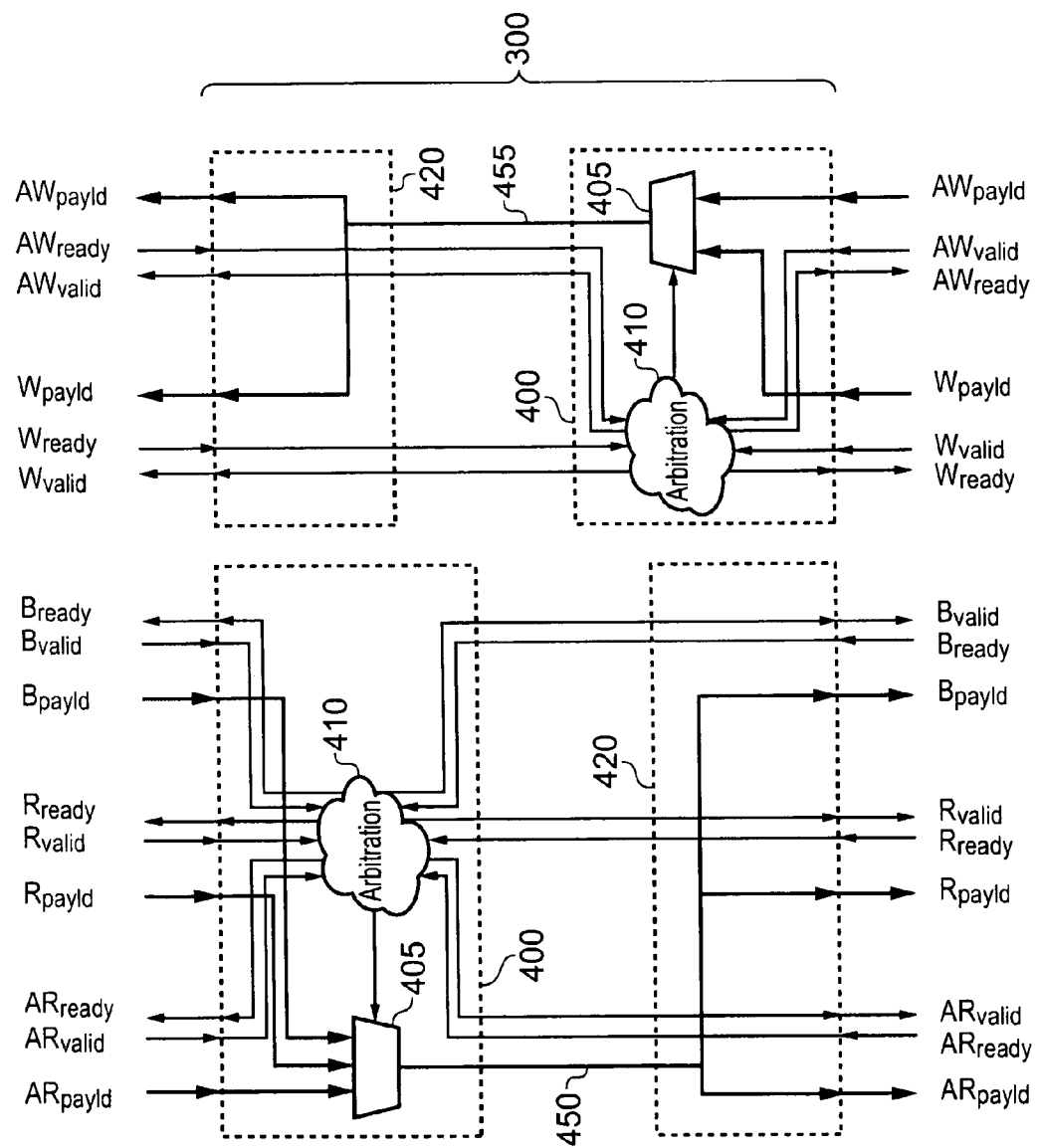
FIG. 9 (First of two parts)

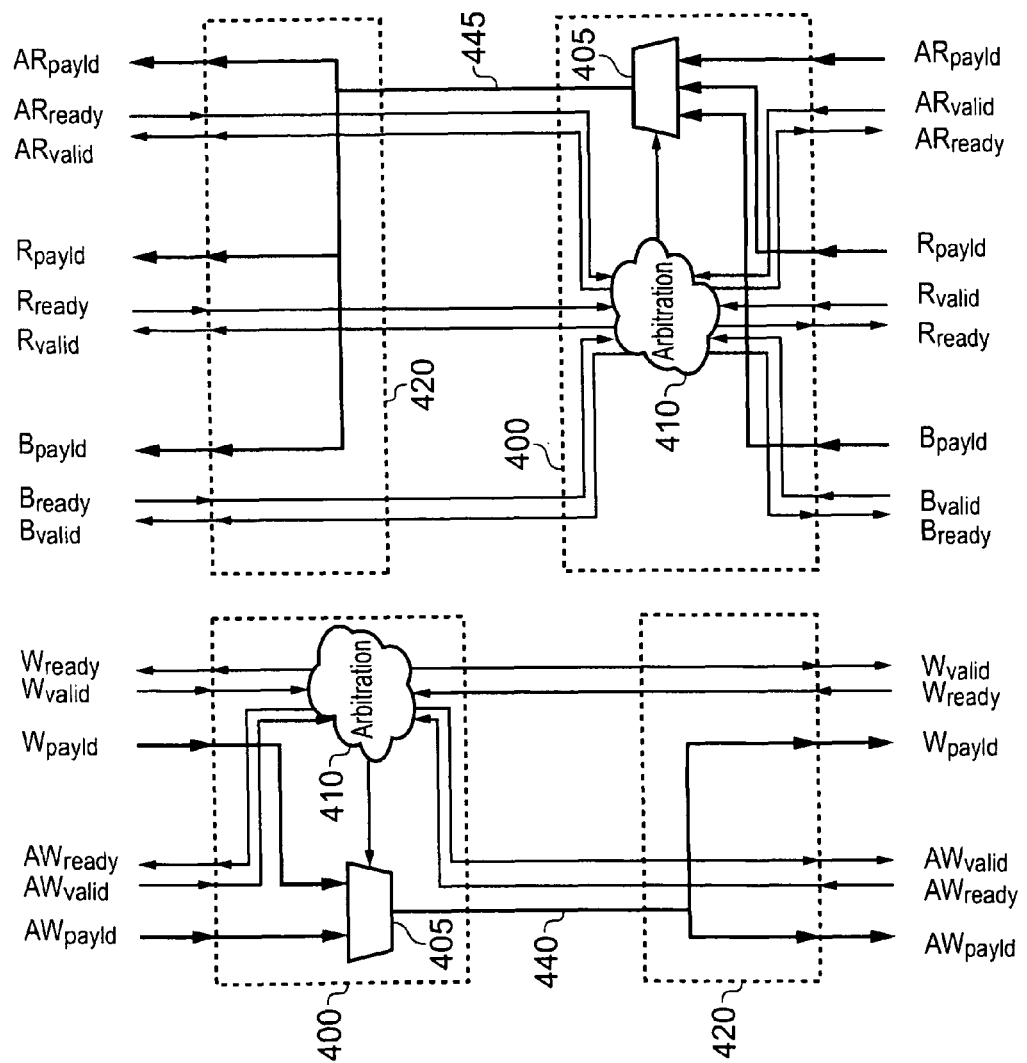
FIG. 9 (Second of two parts)

COMMUNICATION INFRASTRUCTURE FOR A DATA PROCESSING APPARATUS AND A METHOD OF OPERATION OF SUCH A COMMUNICATION INFRASTRUCTURE

BACKGROUND OF THE INVENTION

1. Field of the Invention

The present invention relates to a communication infrastructure for a data processing apparatus, and a method of operating such a communication infrastructure.

2. Description of the Prior Art

A communication infrastructure for a data processing apparatus may take the form of interconnect circuitry arranged to interconnect a number of master devices with a number of slave devices. It is known for the communication infrastructure to comprise one or more crossbar circuits, a crossbar circuit also sometimes being referred to as a bus matrix. Such a crossbar circuit typically couples a group of master devices with a group of slave devices to enable transactions to be performed. In particular, each of the master devices provides a master interface coupled to the crossbar circuit and each slave device provides a slave interface coupled to the crossbar circuit. When a master device connected to the crossbar circuit wishes to communicate with a target slave device connected to the crossbar circuit, then a transaction is initiated from that master device's master interface (the initiating master interface) to the target slave device's slave interface (the target slave interface). Each transaction consists of an address transfer from the initiating master interface to the target slave interface, and one or more data transfers between that initiating master interface and that target slave interface. For a write transaction, these data transfers will pass from the initiating master interface to the target slave interface (in some implementations there will additionally be a write response transfer from the target slave interface to the initiating master interface), whilst for a read transaction these data transfers will pass from the target slave interface to the initiating master interface.

A crossbar circuit will provide a plurality of connection paths for coupling the various master devices and slave devices. The way in which transfers are routed via those connection paths will be dependent on the bus protocol employed within the crossbar circuit. A common type of bus protocol used within such crossbar circuits is known as a split transaction protocol. In accordance with such a split transaction protocol, the plurality of connection paths within the crossbar circuit provide at least one address channel for carrying address transfers and at least one data channel for carrying data transfers. An example of such a split transaction protocol is the AXI (Advanced eXtensible Interface) protocol developed by ARM Limited, Cambridge, United Kingdom. Herein, such split transaction protocols will also be referred to as multi-channel communication protocols.

As communication infrastructures increase in complexity, it is known to wish to connect together two or more separate crossbars, each crossbar having various master and slave devices connected thereto. Such a communication infrastructure is illustrated schematically in FIG. 1. As shown therein, a first crossbar 15 has a plurality of master devices 10 (also referred to as initiator devices) and a number of slave devices 20 (also referred to as target devices) connected thereto. Similarly, a second crossbar 35 has a plurality of master devices 30 and a plurality of slave devices 40 connected thereto.

In addition to transactions performed between the master devices 10 and the slave devices 20 connected to the first crossbar 15, or transactions performed between the master devices 30 and the slave devices 40 connected to the second crossbar 35, it is also necessary to enable transactions to be performed between a master device 10 connected to the first crossbar 15 and a slave device 40 connected to the second crossbar 35, or between a master device 30 connected to the second crossbar 35 and a slave device 20 connected to the first crossbar 15.

One way to seek to achieve such functionality is to provide a bidirectional link 25. When a transaction is initiated from a master device 10 to a slave device 40, the bidirectional link 25 needs to support a communication path 45. Similarly, for a transaction initiated by a master device 30 to a slave device 20, the bidirectional link 25 needs to support a communication path 50. When each of the crossbars 15, 35 employ a multi-channel interconnect protocol, then these communication paths 45, 50 need to provide the necessary channels to support that protocol, as is illustrated schematically in FIGS. 2A and 2B with reference to the example of the earlier-mentioned AXI protocol.

The AXI protocol provides a number of channels over which information and data are transferred when a transaction is performed from an initiating master interface 202 of a master device 206 (either the master 10 or the master 30 in the example of FIG. 1) to a target slave interface 204 of a slave device 210 (either the slave 20 or the slave 40 in the example of FIG. 1). In particular, a write address (AW) channel 205 is provided for carrying address transfers of write transactions, a write data (W) channel 210 is provided for carrying data transfers of write transactions, a write response (B) channel 215 is provided for returning transaction status information to the master interface at the end of a write transaction (such transaction status information indicating for example whether the transaction completed successfully, or whether an error occurred, etc), a read address (AR) channel 220 for carrying address transfers of read transactions, and a read data (R) channel 225 for carrying data transfers of read transactions. All five of these channels need to be supported by the communication path 200 passing from the initiating master interface 202 to the target slave interface 204. The crossbar 208 having associated slave interface 212 and master interface 214 (these crossbar interfaces also being referred to herein as internal interfaces to distinguish from the interfaces of the master and slave devices) can support these channels when routing communications between the initiating master interface 202 and the target slave interface 204, and hence everything operates correctly when the initiating master interface and target slave interface are coupled to the same crossbar (crossbar 15 or crossbar 35). However, support for the five channels is also needed where the initiating master interface and target slave interface are coupled to different crossbars, as will be the case for the communication paths 45, 50 of FIG. 1.

As shown in FIG. 2B, each of the five channels in FIG. 2A provide payload data passing from the source to the destination, along with a pair of handshake signals. In the AXI protocol, these handshake signals take the form of a valid signal passing over the channel in the same direction as the payload data, and a ready signal passing over the channel in an opposite direction to the payload data and the valid signal, but it will be appreciated that in other protocols different forms of handshake signals may be used, for example request/acknowledge handshake signals. For the AW, W and AR channels, the source is the initiating master interface and the destination is the target slave interface (such channels being referred to herein as forward channels), but for the B and R channels the source is the target slave interface and the destination is the initiating master interface (such channels being referred to herein as reverse channels).

A simple bidirectional link 25 may be constructed in the manner shown schematically in FIG. 3. FIG. 3 shows the same system as discussed earlier with reference to FIG. 1, but explicitly shows the various master interfaces 12, 32 associated with the master devices 10, 30, the various slave interfaces 22, 42 associated with the slave devices 20, 40, and the various internal slave interfaces 100, 120 and internal master interfaces 110, 130 provided within the two crossbars 15, 35. In the embodiment shown, the simple bidirectional link 25 consists of two separate communication paths. In particular, a first communication path 145 passes from the first crossbar 15 to the second crossbar 35, connecting an internal master interface 110 of the first crossbar 15 with an internal slave interface 120 of the second crossbar 35. In addition, a second, separate, communication path 155 is provided from the second crossbar 35 to the first crossbar 15, connecting an internal master interface 130 of the second crossbar 35 with an internal slave interface 100 of the first crossbar 15.

To support a transaction from an initiating master interface 12 coupled to the first crossbar 15 to a target slave interface 42 coupled to the second crossbar 35, the first communication path 145 needs to support all of the required channels of the multi-channel communication protocol, i.e. five channels for the AXI example discussed earlier with reference to FIG. 2A. Assuming the first communication path 145 does support all of these channels, then a communication path 140 can be established from the master interface 12 to the slave interface 42 as shown in FIG. 3, with the first communication path 145 forming part of that overall communication path 140.

Similarly, the second communication path 155 must also support all of the channels, and assuming it does so it will then be possible to establish a communication path 150 from an initiating master interface 32 coupled to the second crossbar to a target slave interface 22 coupled to the first crossbar 15, with the second communication path 155 forming part of that overall communication path 150.

However, as illustrated schematically in FIG. 4, this leads to the need to provide a significant number of connection lines within the bidirectional link 25 to provide the two separate communication paths 145, 155. In particular, as will be apparent from FIG. 3, the bidirectional link 25 is connected at either of its ends to an internal master interface and to an internal slave interface of an associated crossbar, and FIG. 4 shows how these connections are made at either end of the bidirectional link. Accordingly, at each end there will be both an internal master interface 200 and an internal slave interface 210. Assuming the earlier example of the AXI protocol, there will be five channels supported at each of these interfaces, thereby requiring the bidirectional link to support the group of connection lines 220 in order to facilitate both the first communication path 145 and the second communication path 155. For the example of an AXI interface, it can be seen from FIG. 4 that this requires ten connection lines to be provided for carrying payload data through the bidirectional link 25 of FIG. 3. However, it would be desirable to reduce the total number of wires required to support such a bidirectional link, since this would not only give rise to space savings, but would also significantly reduce wire routing complexity within the communication infrastructure.

A significant amount of research work has been performed in the area of a bidirectional Network-on-Chip (NoC) link for communicating between different components on a chip. For example, the article "Route Packets, Not Wires: On-Chip Interconnection Networks", Proc. 38$^{th}$ Design Automation Conf. (DAC '01), pp. 684-689, June 2001, by W J Dally et al is an initial paper discussing packetised on-chip communication, from which the above-mentioned bidirectional NoC link was constructed. The book "Interconnection Networks—An Engineering Approach", Morgan Kaufmann, 2002, by J Duato et al describes this bidirectional NoC link as an approach to enable the same packetised on-chip communication suggested by the above-mentioned W J Dally article. Further, the article "Xpipes: A Network-on-Chip Architecture for Gigascale Systems-on-Chip", IEEE Circuits and Systems Magazine, Second Quarter, 2004, pp 18-31, by D Bertozzi et al examines the use of the bidirectional NoC link protocol as the basis for all on-chip communication in a high performance System-on-Chip (SoC). It also describes an IP library for creating such a system.

In accordance with the bidirectional NoC link approach, a link is provided with one channel existing in each direction. The channels have no visibility of masters or slaves, and only know a source and a destination. Information is packetised into multiple beats, with one header beat, one or more payload beats and one tail beat. The header contains routing information, the payload consists of the data, and the tail signifies the end of the packet. Such a bidirectional NoC link therefore has one channel for moving packets in a forward direction and another channel for moving packets in a reverse direction. Whilst such an approach allows forward and reverse data to be transmitted across any channel due to its packetised nature, it requires protocol conversion to take place at the interfaces to the bidirectional NoC link such that the data conforms to the same packet standard. The requirement for such protocol conversion adds cost and complexity to the design. Further, since the bidirectional NoC link has no visibility of masters or slaves, and merely supports one forward channel and one reverse channel, deadlock issues can arise when such an approach is used to try to link two crossbar circuits, where each crossbar circuit supports a multi-channel communication protocol. Such deadlock issues can result in the need for more complex cyclic dependency avoidance schemes, therefore requiring more silicon area and giving rise to increased energy dissipation. In particular these cyclic dependencies arise from trying to pass all channels of a multi-channel communication protocol over one bidirectional NoC link channel.

In systems with less complex interconnect requirements, it is known to employ non-split transaction protocols instead of the earlier discussed split transaction protocols. In accordance with a non-split transaction protocol, there is a fixed timing relationship between the address transfer of a transaction and the subsequent one or more data transfers of that transaction. An example of such a non-split transaction protocol is the AHB bus protocol developed by ARM Limited, Cambridge, United Kingdom. In accordance with the AHB protocol, no handshaking signals are used. In a development board previously produced by ARM Limited called the integrator core module (produced in association with the ARM 926, 946 and 966 processors) two boards were interconnected via a serial bus, within each board ARM's AHB bus protocol being used. Time division multiplexing techniques were used at the interface of each board to the serial bus in order to reduce the pin count at the interface of the board to the serial bus.

However, seeking to use TDM techniques to reduce pin count when coupling switching circuits using multi-channel communication protocols (i.e. split transaction protocols) would lead to a very inefficient design, and/or bandwidth issues, since all of the various channels would need to be catered for in the TDM approach, and some channels have significantly larger bandwidth requirements than others. In addition, some channels may be more latency-critical than others, and hence should be prioritised over others, and TDM approaches do not cater for this situation.

SUMMARY OF THE INVENTION

Viewed from a first aspect, the present invention provides a communication infrastructure for a data processing apparatus, comprising: first switching circuitry for coupling to at least one first master interface and at least one first slave interface; second switching circuitry for coupling to at least one second master interface and at least one second slave interface; said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels; a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and control circuitry for multiplexing at least one forward channel of the first communication path and at least one reverse channel of the second communication path, such that the 2m channels formed by the first and second communication paths are provided by the n connection lines of the bidirectional link, the control circuitry being arranged to perform said multiplexing in dependence on the handshaking signals associated with the channels to be multiplexed; whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

In accordance with the present invention, the bidirectional link has a plurality n of connection lines, where n is less than 2m, m being the number of channels within a communication path. Further, control circuitry is used to multiplex at least one forward channel of the first communication path provided by the bidirectional link and at least one reverse channel of the second communication path provided by the bidirectional link to enable the 2m channels formed by the first and second communication paths to be provided by the n connection lines. Further, the multiplexing is performed in dependence on the handshaking signals associated with the channels to be multiplexed. Such an approach enables a reduction in the number of connection lines that would be required when employing the bidirectional link of the prior art approach discussed earlier with reference to FIGS. 3 and 4, thereby yielding a significant reduction in wire routing complexity. Further, when compared with the earlier-mentioned bidirectional NoC link prior art, the approach of the present invention does not suffer from the protocol conversion problems of that prior art, thereby significantly reducing complexity when interconnecting switching circuits employing a multi-channel communication protocol. By causing the control circuitry to perform its multiplexing operating in dependence on handshaking signals associated with the channels to be multiplexed, this provides much improved performance when compared with a TDM approach, since consideration can be given as to which channels have active data to transmit when deciding which channel to multiplex onto a particular connection line at any point in time.

The first and second switching circuits can take a variety of form. In one embodiment, each switching circuit may be formed by a single crossbar circuit, but in alternative embodiments either or both of the first and second switching circuits can be formed by more complex structures, such as multiple crossbar circuits and associated interconnecting structures. In some embodiments the first and second switching circuits may themselves include one or more bidirectional links.

In one embodiment, the control circuitry is further arranged to multiplex at least one reverse channel of the first communication path and at least one forward channel of the second communication path. Hence, in such embodiments, the multiplexing occurs in respect of at least one forward channel and at least one reverse channel of both communication paths. This further reduces the number of connection lines that need to be provided by the bidirectional link in order to support the first and second communication paths, with each of those communication paths providing m channels.

In one embodiment, an initiating master interface is coupled to the first switching circuitry, a target slave interface is coupled to the second switching circuitry, and the first communication path of the bidirectional link forms part of the communication path from the initiating master interface to the target slave interface. Alternatively, or in addition, an initiating master interface may be coupled to the second switching circuitry and a target slave interface may be coupled to the first switching circuitry, in which event the second communication path of the bidirectional link forms part of the communication path from the initiating master interface to the target slave interface.

The control circuitry can take a variety of forms. However, in one embodiment, for each connection line of the bidirectional link onto which multiple channels are to be multiplexed, the control circuitry comprises: multiplexer circuitry for multiplexing payload data from each of the multiple channels to be multiplexed; and arbitration circuitry for controlling the multiplexer circuitry in dependence on the handshaking signals associated with the multiple channels to be multiplexed.

In one embodiment, the control circuitry can also include de-multiplexer circuitry for de-multiplexing the payload data from the destination end of the connection line onto the required channel. However, in one embodiment, the use of such de-multiplexing circuitry is not necessary, since at the destination end of the bidirectional link the payload data may merely be broadcast on all of the multiple channels associated with that connection line, with the control circuitry preventing propagation of handshaking signals within those channels whose payload data is not currently being transmitted by the connection line.

The manner in which the arbitration circuitry controls the multiplexer circuitry in dependence on the handshaking signals can take a variety of forms. However, in one embodiment, for each channel the arbitration circuitry receives a first handshaking signal from the first switching circuitry and a second handshaking signal from the second switching circuitry, both the first handshaking signal and the second handshaking signal needing to be asserted for a channel to enable the arbitration circuitry to output the payload data of that channel onto the associated connection line of the bidirectional link. In one embodiment, these first and second handshaking signals may take the form of a valid handshaking signal and the corresponding ready handshaking signal.

In one embodiment, if the first and second handshaking signals for at least two of the multiple channels to be multiplexed are asserted, the arbitration circuitry applies a prioritisation operation in order to determine for which of those at least two channels the payload data will be output over the associated connection line. Hence, in such embodiments, different priorities can be associated with different channels, therefore, for example, allowing more latency-critical channels to be prioritised over other less latency-critical channels In situations where the handshaking signals for at least two channels are asserted at a particular point in time, only one of those channels can be granted access to the connection line at that time, and the payload data for any other channel whose handshaking signals are asserted will be stalled. It is important to ensure that neither the initiating master interface nor the target slave interface associated with the transfer of that stalled payload data incorrectly assume that the payload data has been transferred. In one embodiment, this is achieved by the arbitration circuitry preventing onward propagation of asserted handshaking signals between the first switching circuitry and the second switching circuitry for any channel other than that channel whose payload data is currently being output over the associated connection line. Hence, considering the valid/ready handshake protocol discussed earlier, if the source of the payload data has asserted a valid signal, and the destination has asserted a ready signal, but the arbiter does not currently allocate that payload data to the connection line, the arbitration circuitry will prevent the onward propagation of the asserted ready signal to the source, and also will prevent the onward propagation of the asserted valid signal to the destination. As a result, neither the source nor the destination will assume that the transfer is complete. In one embodiment, the valid signal is "sticky", such that once asserted by the source it remains asserted until an asserted ready signal is received by the source. In contrast, the ready signal is not typically sticky, and accordingly a destination may assert and de-assert ready signals as it wishes.

In one embodiment, at an output end of each connection line of the bidirectional link onto which multiple channels are multiplexed, the payload data output over that connection line is output on each of the multiple channels multiplexed onto that connection line, the payload data only being considered valid by that channel whose asserted handshaking signals have been propagated by the arbitration circuitry. Hence, as mentioned earlier, such an approach avoids the need to provide demultiplexing circuitry at the output end of each connection line, since by only allowing the onward propagation of the handshaking signals in association with the payload data that is actually granted access to the connection line at any point in time, the payload data broadcast from the output end onto the multiple channels will only actually be considered valid by the correct channel, since it is only that channel that will have received the propagated handshaking signals.

The prioritisation operation applied by the arbitration circuitry can take a variety of forms. For example, in one embodiment, the communication infrastructure may further comprise a priority storage for storing predetermined priority data referenced by the arbitration circuitry when performing said prioritisation operation. The priority data encoded within such a priority storage may take a variety of forms, and hence for example may encode a round-robin scheme, or a fixed priority scheme. The fixed priority scheme may, for example, indicate that one channel has higher priority than another channel that are both candidates for being multiplexed onto a single connection line. In another example the priority scheme may identify that certain types of transaction are higher priority than other types of transaction, for example that a burst transaction identifying a sequence of data transfers should be processed so that all of the data transfers of that transaction are completed prior to allowing any other transaction to use the connection line.

Whilst the information in the priority storage may be fixed, in one embodiment it may be reprogrammed as desired.

As an alternative to using the priority storage, or in addition, the arbitration circuitry may be arranged to receive one or more input priority signals which vary dependent on the transactions currently being handled by the communication infrastructure, and to reference the one or more input priority signals when performing the prioritisation operation. Such an approach allows other components within the communication infrastructure, or coupled to the communication infrastructure, to specify priority information on a transaction-by-transaction basis. For example, a master initiating a transaction may specify that a particular transaction needs to be treated as high priority, a slave device may provide information indicating that it is particularly busy, and hence at the current time transactions that are destined for it should be treated as a lower priority, etc. Additionally, quality of service mechanisms may indicate that certain transactions require high priority in order to guarantee a desired quality of service to a master or a slave.

The information passed over the channels can take a variety of forms. However, in one embodiment, each channel has payload data and associated handshaking signals, the handshaking signals comprising a valid signal passed over the channel in the same direction as the payload data, and a ready signal passed over the channel in an opposite direction to the payload data and the valid signal.

In one embodiment, the channels of said 2m channels that are multiplexed, and the connection lines that those channels are multiplexed onto, are chosen having regard to one or more predetermined criteria. The predetermined criteria applied when deciding which channels to multiplex together onto a particular connection line can take a variety of forms. However, in one embodiment, the predetermined criteria is chosen so as to ensure that a plurality of highly utilised channels are provided on different connection lines of the bidirectional link. Hence, in such embodiments, the plurality of highly utilised channels are dispersed over the available connection lines with the aim of minimising connection line usage conflict. In one embodiment, in one or more of the connection lines, at least one highly utilised channel is multiplexed with one or more lower utilised channels.

Typically, the data channels used to transfer write data and read data are highly utilised channels, and accordingly in one embodiment the multiplexing is chosen such that the write data channel is provided on a different connection line to the read data channel.

In an alternative embodiment, or in addition, the predetermined criteria is chosen so as to ensure that a plurality of address channels are provided on different connection lines of the bidirectional link. Hence, the write address channel may be provided on a different connection line to the read address channel. One benefit of such an approach is that it allows read transfers to overtake write transfers without having to perform any re-ordering.

In an alternative embodiment, or in addition, the predetermined criteria can be chosen to ensure that read address channels are not multiplexed with write data channels. One benefit of such an approach is that read transactions do not have to wait for write burst transactions to complete, during a write burst transaction the write data channel being busy for prolonged periods of time.

In one particular embodiment, the m channels of each of the first and second communication paths comprise a read address channel, a read data channel, a write address channel, a write data channel, and a write response channel, and within the bidirectional link the following channels are multiplexed together: (a) the write address and write data channels of the first communications path; (b) the write address and write data channels of the second communications path; (c) the read data and write response channels of the first communications path and the read address channel of the second communications path; (d) the read data and write response channels of the second communications path and the read address channel of the first communications path; whereby the 10 channels provided by the first and second communication paths are provided by four connection lines of the bidirectional link. This particular embodiment provides a significant reduction in connection lines, whilst balancing bandwidth requirements through the selection of the channels to be multiplexed. Further, such a system can reduce latency and overall system complexity when compared with an approach where protocol conversion needs to take place prior to communication of any data across a bidirectional link, as for example would be the case if the earlier-mentioned prior art bidirectional NoC link approach were taken.

Whilst it is possible for the first switching circuitry and the second switching circuitry to include different multi-channel communication protocols, in one embodiment the multi-channel communication protocol employed by the first switching circuitry is the same as the multi-channel communication protocol employed by the second switching circuitry.

In one particular embodiment the multi-channel communication protocol is an AXI protocol providing 5 channels per communication path, and the number n of connection lines within the bidirectional link is less than 10.

The manner in which the bidirectional link is interfaced with the first and second switching circuits can take a variety of forms. However, in one embodiment, the first switching circuitry has a plurality of first internal master interfaces and a plurality of first internal slave interfaces; the second switching circuitry has a plurality of second internal master interfaces and a plurality of second internal slave interfaces; the bidirectional link is connected to one of said first internal master interfaces, one of said first internal slave interfaces, one of said second internal master interfaces and one of said second internal slave interfaces; the first communication path passes from said one of the first internal master interfaces to said one of the second internal slave interfaces to form part of the communication path established when the initiating master interface is coupled to the first switching circuitry and the target slave interface is coupled to the second switching circuitry; and the second communication path passes from said one of the second internal master interfaces to said one of the first internal slave interfaces to form part of the communication path established when the initiating master interface is coupled to the second switching circuitry and the target slave interface is coupled to the first switching circuitry. Such an approach has been found to provide a particularly simple and efficient mechanism for interfacing the bidirectional link with the first and second switching circuits.

Typically the initiating master interface will be provided on a master device, but in some situations, a transaction may be initiated by the switching circuitry without there being any real master device and/or real slave device for that transaction.

Viewed from a second aspect, the present invention provides a method of operating a communication infrastructure for a data processing apparatus, the communication infrastructure comprising first switching circuitry for coupling to at least one first master interface and at least one first slave interface, second switching circuitry for coupling to at least one second master interface and at least one second slave interface, and a bidirectional link interconnecting said first switching circuitry and said second switching circuitry, the method comprising the steps of: employing within said first switching circuitry and said second switching circuitry a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels; providing a plurality n of connection lines within the bidirectional link, where n is less than 2m; arranging the bidirectional link to support a first communication path from the first switching circuitry to the second switching circuitry, and a second communication path in an opposite direction from the second switching circuitry to the first switching circuitry, both the first communication path and the second communication path providing said m channels; and multiplexing at least one forward channel of the first communication path and at least one reverse channel of the second communication path, such that the 2m channels formed by the first and second communication paths are provided by the n connection lines of the bidirectional link, said multiplexing being performed in dependence on the handshaking signals associated with the channels to be multiplexed; whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

Viewed from a third aspect, the present invention provides a communication infrastructure for a data processing apparatus, comprising: first switching means for coupling to at least one first master interface means and at least one first slave interface means; second switching means for coupling to at least one second master interface means and at least one second slave interface means; said first switching means and said second switching means for employing a multi-channel communication protocol, whereby on initiation of a transaction from an initiating master interface means to a target slave interface means for the transaction, a communication path is established from said initiating master interface means to said target slave interface means, the communication path comprising m channels, said m channels comprising one or more forward channels from said initiating master interface means to said target slave interface means and one or more reverse channels from said target slave interface means to said initiating master interface means, and handshaking signals being associated with each of the m channels; a bidirectional link means for interconnecting said first switching means and said second switching means, the bidirectional link means comprising a plurality n of connection lines, where n is less than 2m, the bidirectional link means for supporting a first communication path from the first switching means to the second switching means, and a second communication path in an opposite direction from the second switching means to the first switching means, both the first communication path and the second communication path providing said m channels; and control means for multiplexing at least one forward channel of the first communication path and at least one reverse channel of the second communication path, such that the 2m channels formed by the first and second communication paths are provided by the n connection lines of the bidirectional link means, the control means for performing said multiplexing in dependence on the handshaking signals associated with the channels to be multiplexed; whereby the bidirectional link means is employed for forming at least part of the communication path for any transaction where the initiating master interface means is one of said at least one first master interface means and the target slave interface means is one of said at least one second slave interface means, or for any transaction where the initiating master interface means is one of said at least one second master interface means and the target slave interface means is one of said at least one first slave interface means.

BRIEF DESCRIPTION OF THE DRAWINGS

The present invention will be described further, by way of example only, with reference to embodiments thereof as illustrated in the accompanying drawings, in which:

FIG. 9 is a diagram illustrating in more detail the components provided within the bidirectional link in order to support the multiplexing of the embodiment illustrated in FIG. 8;

DESCRIPTION OF EMBODIMENTS

Figure 3:
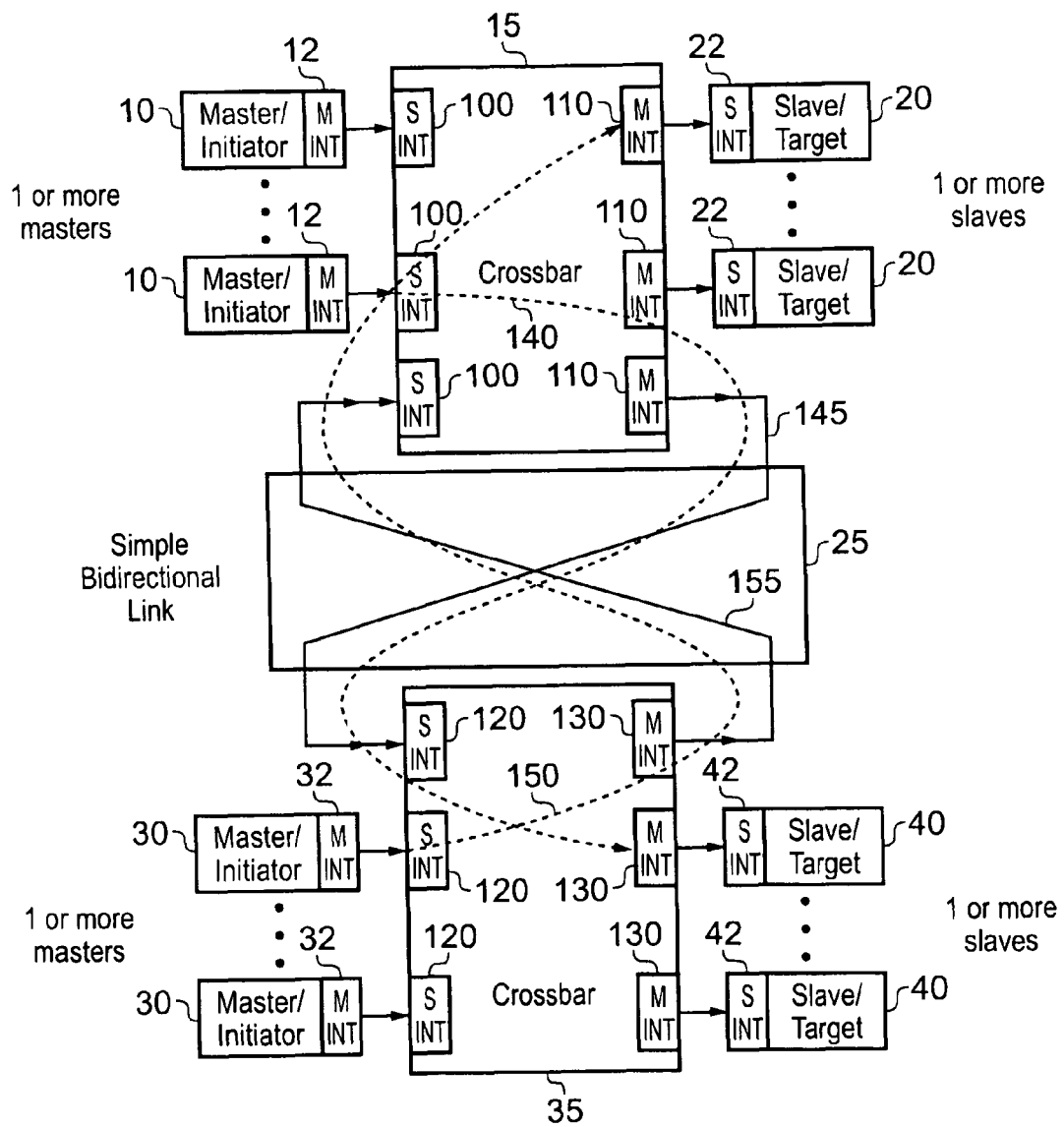
FIG. 3 illustrates the construction of a simple bidirectional link in accordance with a known prior technique.
Figure 4:
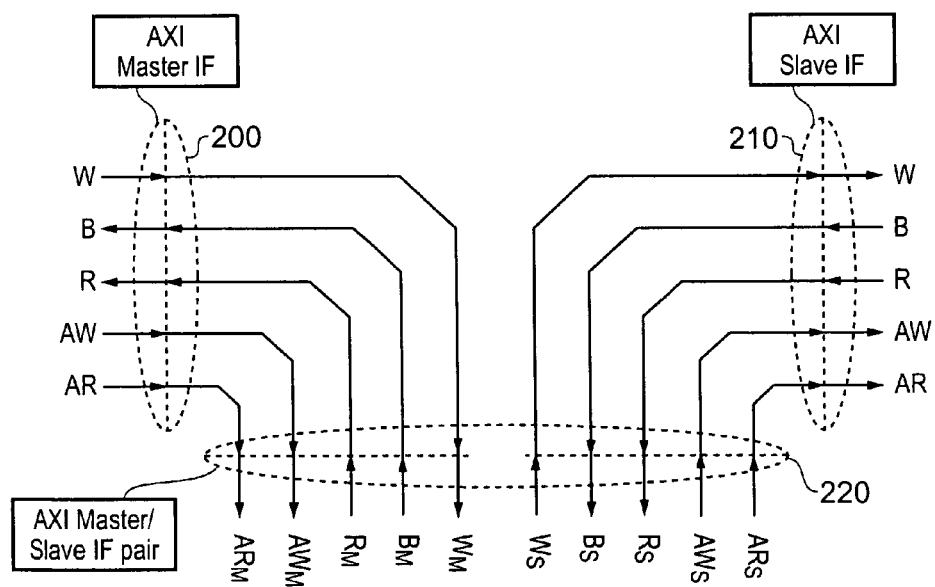
FIG. 4 illustrates how the various channels may be supported using the simple bidirectional link of FIG. 3.
Figure 5:
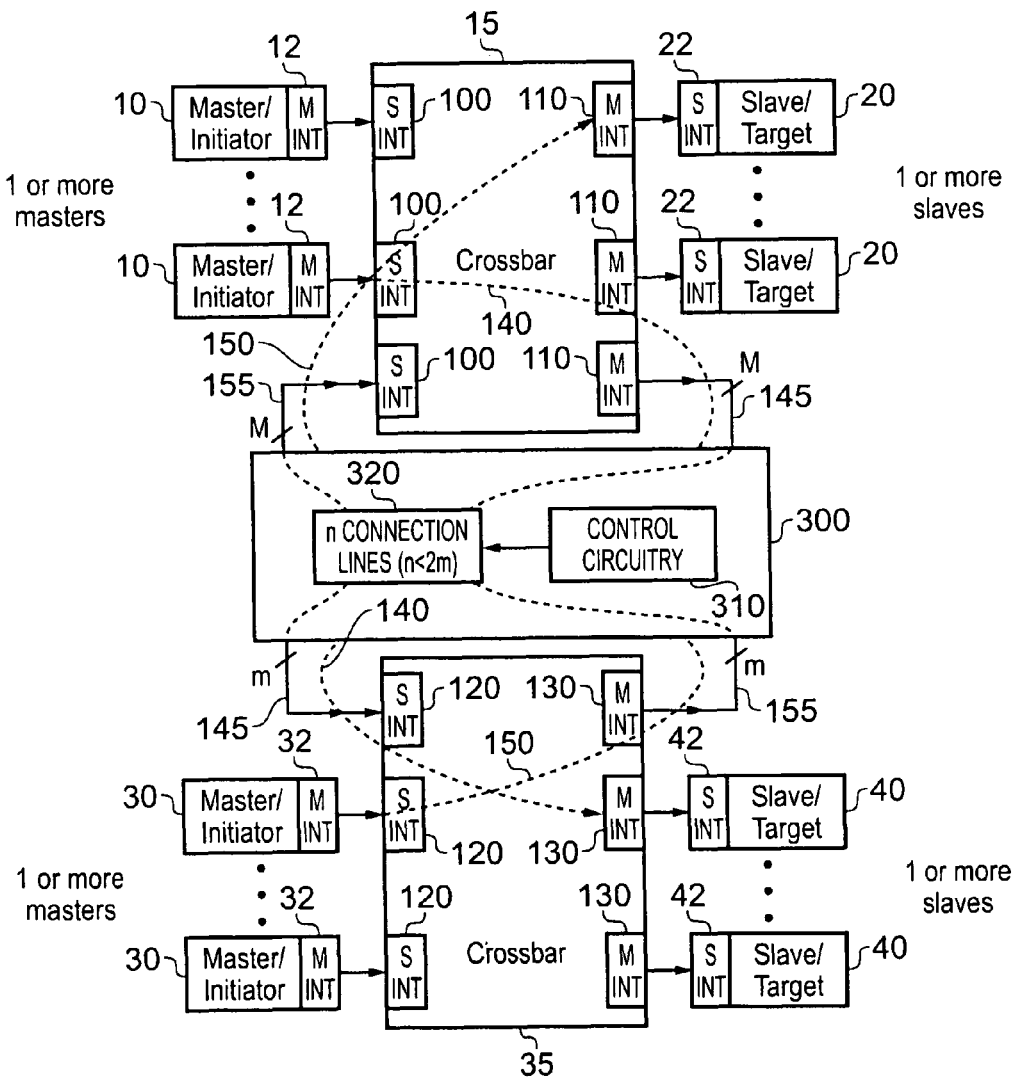
FIG. 5 illustrates a communication infrastructure for a data processing apparatus in accordance with one embodiment.

FIG. 5 is a block diagram illustrating a communication infrastructure in accordance with a first embodiment. Those elements which are the same as the elements discussed earlier with reference to FIG. 3 are labelled with the same reference numerals. As with the FIG. 3 example, the communication infrastructure comprises a first crossbar circuit 15 coupled to a second crossbar circuit 35 via a bidirectional link. The crossbar circuits may be on different chips or provided within the same chip. Instead of the simple bidirectional link 25 discussed earlier with reference to FIG. 3, in the embodiment shown in FIG. 5 the bidirectional link 300 is provided. The bidirectional link 300 still provides a first communication path 145 from an internal master interface 110 of the first crossbar 15 to an internal slave interface 120 of the second crossbar 35, and a second communication path 155 from the internal master interface 130 of the second crossbar 35 to the internal slave interface 100 of the first crossbar 15. However, rather than each of the two communication paths having their own dedicated connection lines, instead both the first communication path 145 and the second communication path 155 are provided via a set of n connection lines 320 whose usage is controlled by control circuitry 310. The value n is less than 2m, where m is the number of channels that need to be supported by each communication path.

To achieve the provision of 2m channels using the n connection lines, the control circuitry multiplexes at least one forward channel of one communication path and at least one reverse channel of the other communication path, with the multiplexing being performed in dependence on the handshaking signals associated with the channels to be multiplexed. As discussed earlier, each channel will typically provide payload data and associated handshaking signals, and for each connection line of the bidirectional link 300 onto which multiple channels are to be multiplexed, the control circuitry provides multiplexer circuitry for multiplexing payload data for each of the multiple channels to be multiplexed onto that connection line, and arbitration circuitry for controlling the multiplexer circuitry in dependence on the handshaking signals associated with those multiple channels.

Figure 6:
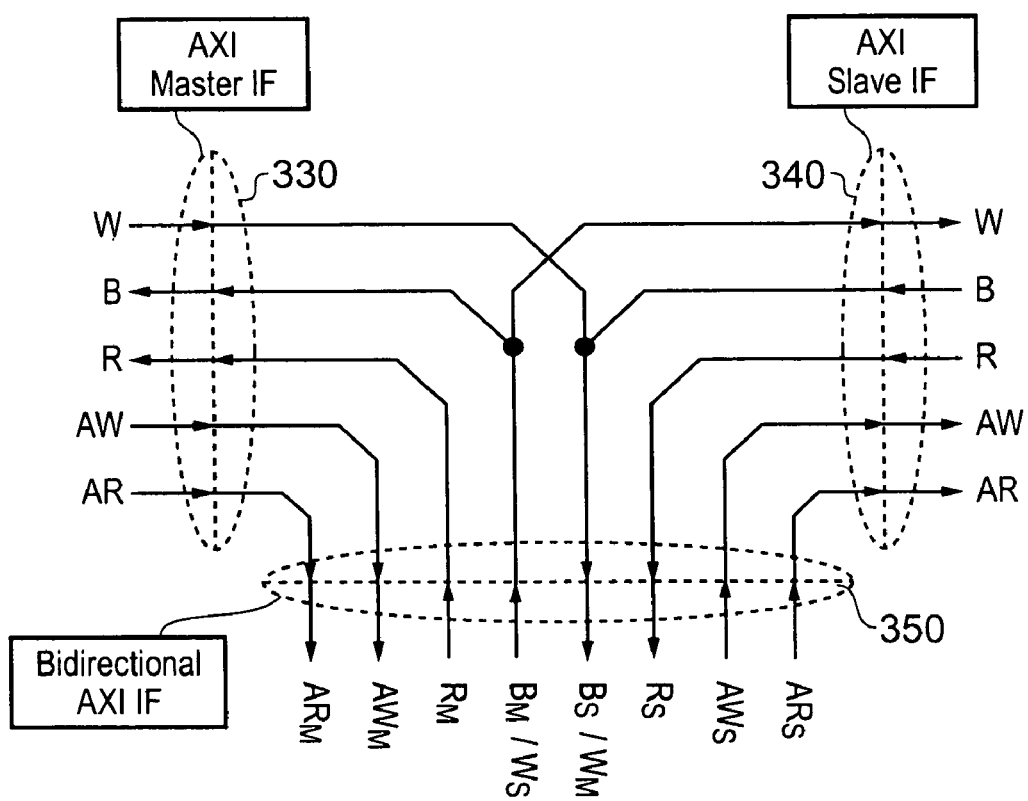
FIGS. 6, 7 and 8 illustrate various ways in which channels may be multiplexed onto the connection lines of the bidirectional link of FIG. 5 in accordance with different embodiments.
Figure 7:
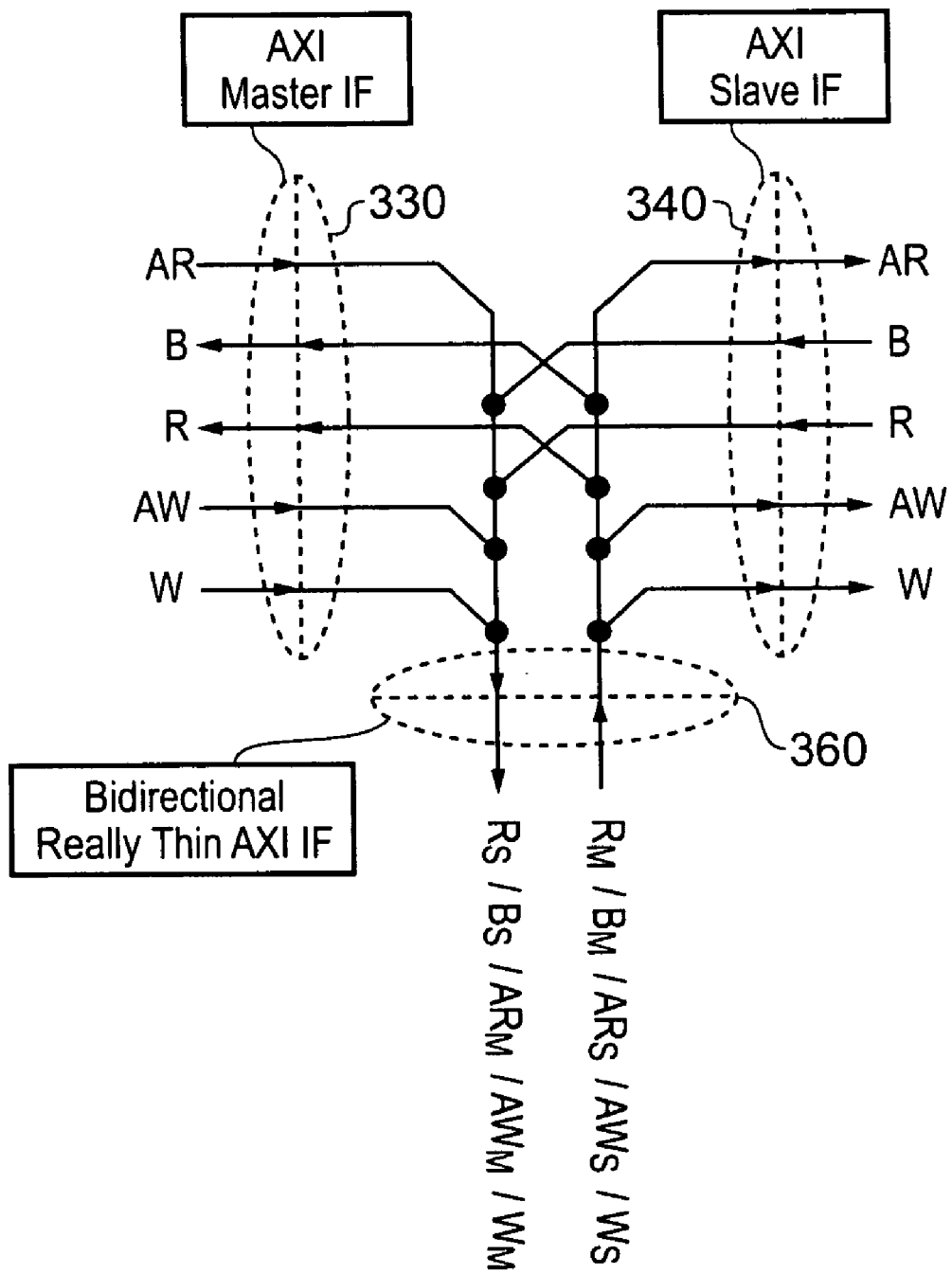
Figure 8:
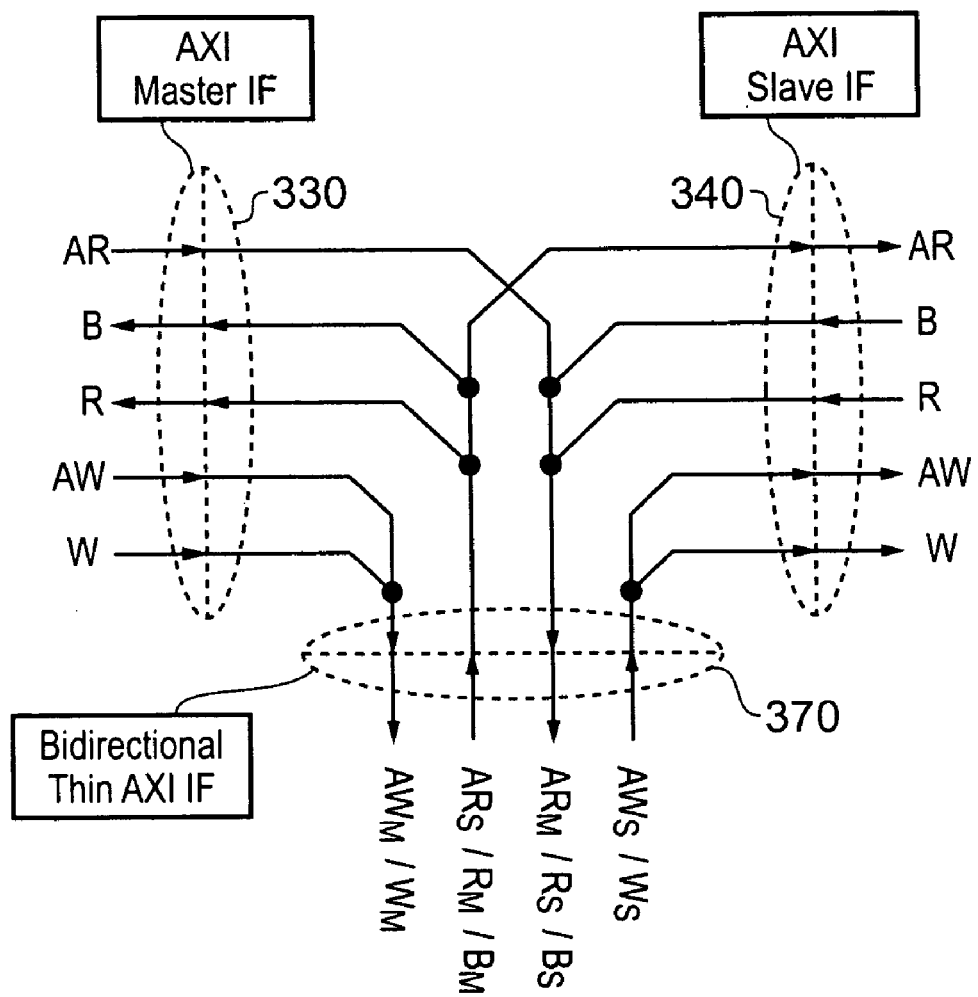

Which forward channels of one communication path are multiplexed with which reverse channels of the other communication path is a matter of design choice, and FIGS. 6 to 8 illustrate just three examples. As is apparent from FIG. 5, where the bidirectional link 300 connects to a particular crossbar, various wires will route to a master interface whilst other wires route to a slave interface. Hence, in the example of FIG. 5, at the interface between the bidirectional link 300 and first crossbar 15, the relevant master and slave interfaces are the master interface 110 and slave interface 100 shown towards the bottom of the crossbar 15. Similarly, considering where the bidirectional link 300 connects to the second crossbar 35, the relevant master and slave interfaces are the master interface 130 and slave interface 120 shown towards the top of the crossbar 35. FIGS. 6 to 8 illustrate these interfaces in accordance three alternative embodiments, and it will be understood that the interfaces illustrated are replicated at either side of the bidirectional link 300 to enable connection to the first crossbar 15 and to enable connection to the second crossbar 35.

Figure 1:
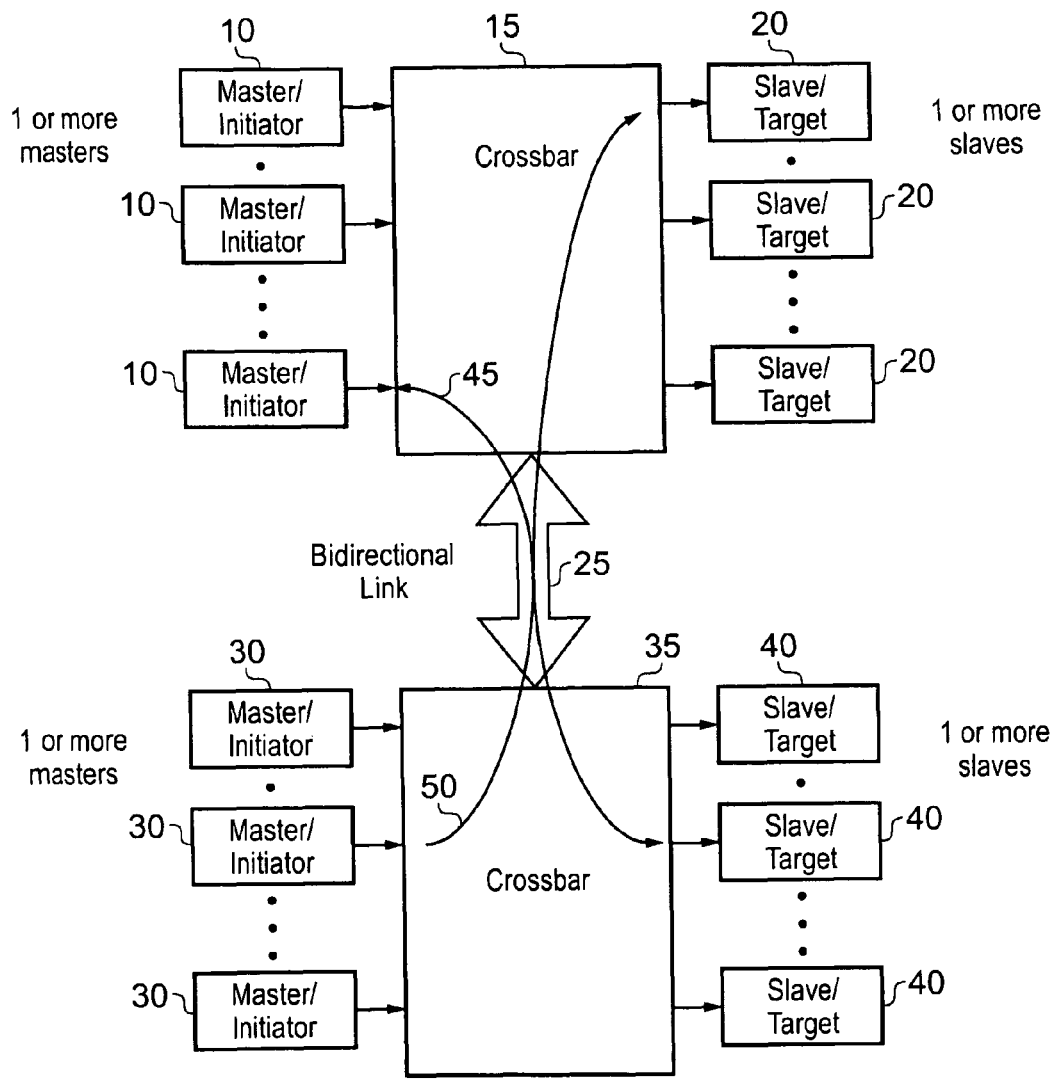
FIG. 1 illustrates the use of a bidirectional link to interconnect two crossbar circuits in accordance with a known technique.
Figure 2A:
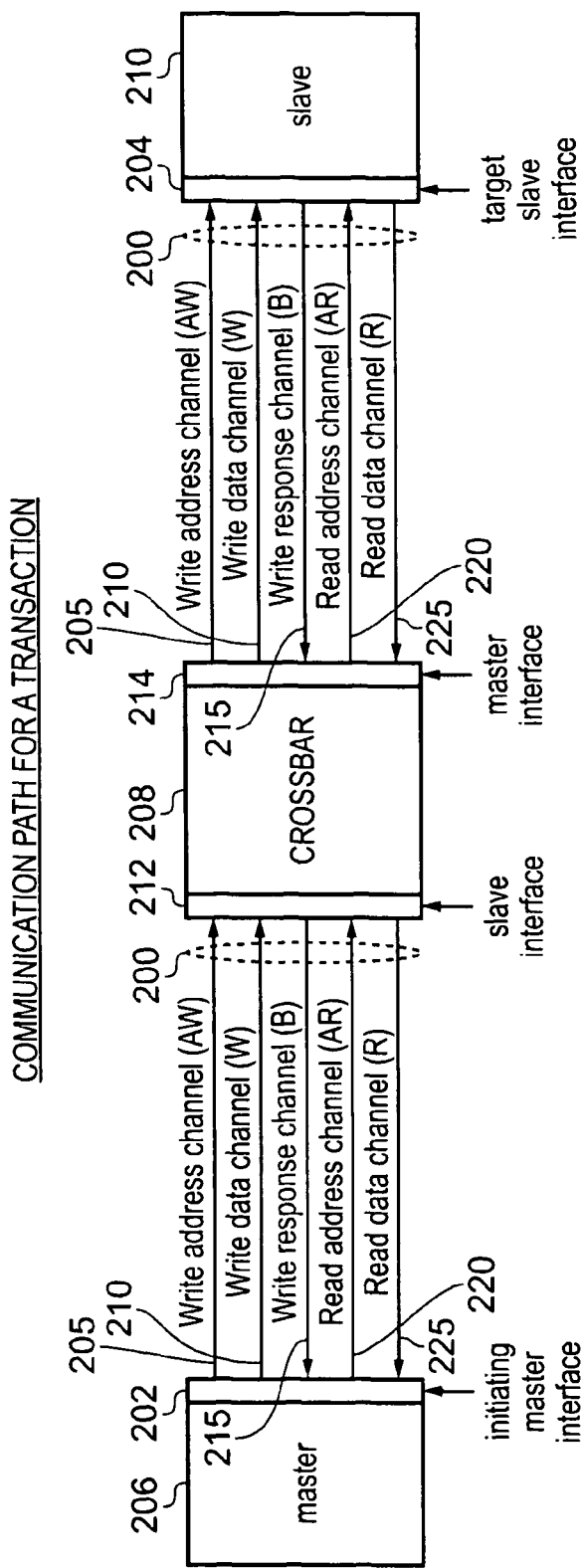
FIG. 2A illustrates how a communication path for a transaction provides multiple channels in accordance with a known technique.
Figure 2B:
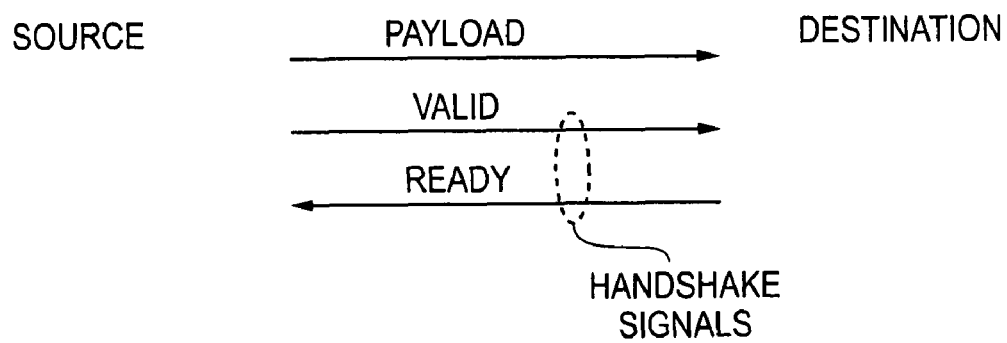
FIG. 2B illustrates the signals provided within each channel in accordance with a known technique.

In the example shown in FIG. 6, both the master interface 330 and the slave interface 340 provide five channels of communication, in this example it being assumed that the crossbar circuits employ the AXI protocol discussed earlier with reference to FIG. 2A. As can be seen, the write data (W) channel of one communication path is multiplexed with the write response (B) channel of the other communication path, and from the earlier description of FIGS. 2A and 2B it will be appreciated that the write data channel is a forward channel and the write response channel is a reverse channel. This multiplexing is replicated in both directions to provide symmetry, and reduces the total number of connection lines required to be provided at the interface of the bidirectional link 300 to eight, this interface being illustrated by the element 350 in FIG. 6. Within the bidirectional link 350, the various channels are qualified by the subscript M or S to denote whether those signals are associated with the master interface 330 or the slave interface 340.

In accordance with this embodiment, all highly utilised channels remain separated, and in particular the write data (W) channels will remain separated from each other and from the read data (R) channels. In addition to keeping the highly utilised data channels separate, it can be seen that in the example of FIG. 6 all of the address channels are also separate, thereby allowing read transactions to overtake write transactions without having to perform any re-ordering. Further, no read address channels are multiplexed with write data channels, thereby ensuring that read transactions to not have to wait for burst write transactions to complete. This should be contrasted with the earlier-mentioned bidirectional NoC link prior art, where read addresses and write bursts would have to travel along the same channel, resulting in a requirement to either be able to reorder AR and W transfers (which could result in significant storage and complexity requirements) or a restriction that AR transfers cannot be sent between an AW transfer and the last W transfer that corresponds with it (for deadlock avoidance reasons).

However, it should be appreciated that the techniques of embodiments of the present invention are not limited to the multiplexing of just one pair of channels. Accordingly, FIG. 7 shows an embodiment where the maximum multiplexing possible takes place, reducing the number of connection lines at the interface 360 of the bidirectional link 300 to two connection lines. In this embodiment, the read data (R) and write response (B) channels of one communication path are multiplexed with the write address (AW), write data (W) and read address (AR) channels of the other communication link. Accordingly, all of the forward channels of one communication link are multiplexed with all of the reverse channels of the other communication link. Whilst this leads to a particularly efficient implementation having regard to the number of connection lines to be provided by the bidirectional link 300, it may give rise to an impact in overall performance due to write data channels and read data channels being multiplexed onto the same connection line, and does not support the decoupling of the read and write transactions in the same way as would the approach of FIG. 6.

However, it is possible to achieve the benefits of the FIG. 6 approach without providing eight connection lines, as illustrated schematically by the embodiment of FIG. 8. In this embodiment, the interface between the bidirectional link 300 and a crossbar consists of four connection lines 370. In this embodiment, the read address (AR) channel of one communication path is multiplexed with the read data (R) and write response (B) channels of the other communication path. Hence, one forward channel of one communication path is multiplexed with two reverse channels of the other communication path. In addition, to further reduce the connection wire count, two forward channels are multiplexed together. In particular, the write address (AW) and the write data (W) channels of each communication path are multiplexed together. In this embodiment, all the highly utilised channels are kept separate, all the address channels are kept separate, and the read address channels are not multiplexed with the write data channels, thereby enabling the benefits discussed earlier with reference to FIG. 6 to be achieved, but with a connection count of only four.

FIG. 9 illustrates in more detail the bidirectional link 300 of FIG. 5 in accordance with one embodiment. The connection lines 320 are formed by the four connection lines 440, 445, 450 and 455 shown in FIG. 9. For each connection line, the control circuitry 310 is formed by an input control stage 400 and an output control stage 420. The input control stage 400 includes arbitration circuitry 410 which is used to control the operation of a multiplexing circuit 405 dependent on handshaking signals associated with the channels to be multiplexed. As shown in FIG. 9, for each channel, a pair of valid and ready handshake signals are associated with the payload data, and these valid and ready signals are preserved by the bidirectional link. However, in one embodiment the arbitration circuitry 410 prevents the onward propagation of valid and ready signals for any channel whose payload data is not currently multiplexed onto the associated connection line by the multiplexer circuitry 405. Due to this approach, it is not then necessary to perform any demultiplexing in the output stage 420, and instead the payload data can be broadcast out on the payload paths of each channel that can be multiplexed onto the associated connection line. The payload data will only be treated as valid if both the valid and ready signals for a particular channel are asserted, and accordingly only one channel connected to the output stage 420 will see valid payload data at any point in time.

Whilst in FIG. 9, both the input stage 400 and output stage 420 are considered to be part of the bidirectional link 300, it will be appreciated that in an alternative embodiment either or both of these elements could be subsumed within the interface of the connected crossbar circuit 15 or 35.

In an alternative embodiment, it would be possible to reduce the number of valid and ready signals passing across the interface to one pair. In particular, the arbitration circuitry can be arranged to choose a channel in the same manner as described earlier. However, instead of propagating the valid and ready signals for the selected channel, the arbitration circuitry would create a selection signal(s) indicating which channel has been selected. Then, the selection signal is used to select the valid and ready signals for that channel to be sent over the bidirectional link. In such embodiments, it will be necessary to provide demultiplexing circuitry at the other end of the bidirectional link to demultiplex the valid and ready signals and output them over the appropriate channel.

Figure 10A:
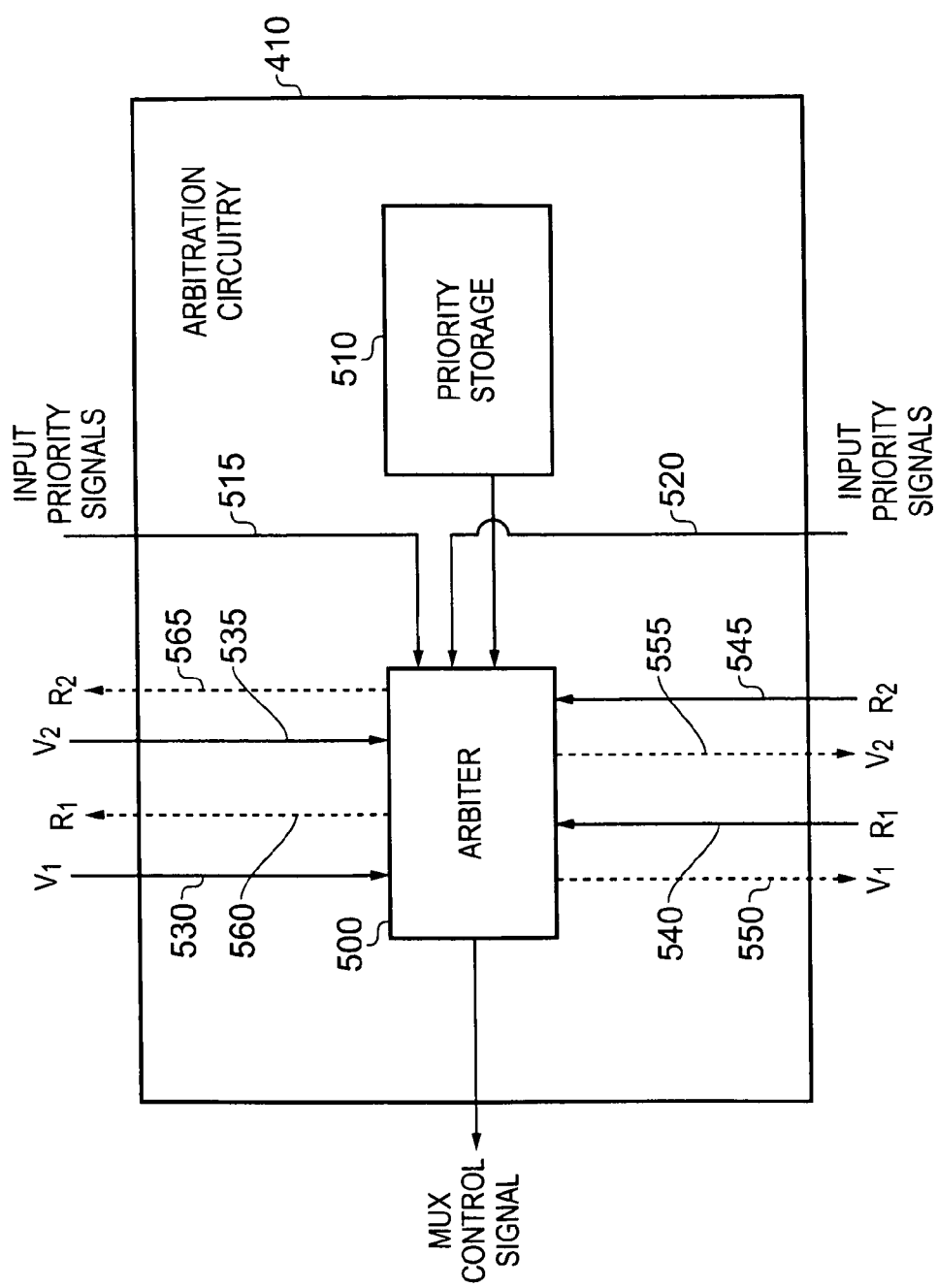
FIGS. 10A and 10B illustrate in more detail the operation of the arbitration circuits of FIG. 9.

FIG. 10A illustrates in more detail the operation of the arbitration circuitry 410 in accordance with one embodiment. The arbitration circuitry 410 includes an arbiter 500 which receives valid signals over paths 530 and 535 from channels to be multiplexed onto a particular connection line. It also receives the corresponding ready signals for those channels over paths 540 and 545. The valid signals pass in the same direction as the payload data, and accordingly for forward channels the valid signals will pass in the forward direction (from the initiating master to the target slave) whilst for reverse channels the valid signals will pass in the reverse direction (from the target slave towards the initiating master). The associated ready signals will always pass in the opposite direction to their associated valid signals. In the example illustrated in FIG. 10A it is assumed that there are two channels to be multiplexed onto a connection line, and accordingly there are two sets of valid and ready signals.

The initiator of an asserted valid signal will consider the transfer of the payload data to be completed when it sees a corresponding asserted ready signal, and similarly the initiator of an asserted ready signal will view the data on the payload path as valid when it also sees an asserted valid signal. Hence, by selectively preventing the onward propagation of those valid and ready signals, the arbiter can ensure that for a channel whose payload data is not currently multiplexed onto the connection line, the source of that payload data continues to assert its valid signal (and continues to output the payload data), and the recipient for that payload data does not treat any payload data it sees on its payload path as valid.

Figure 10B:
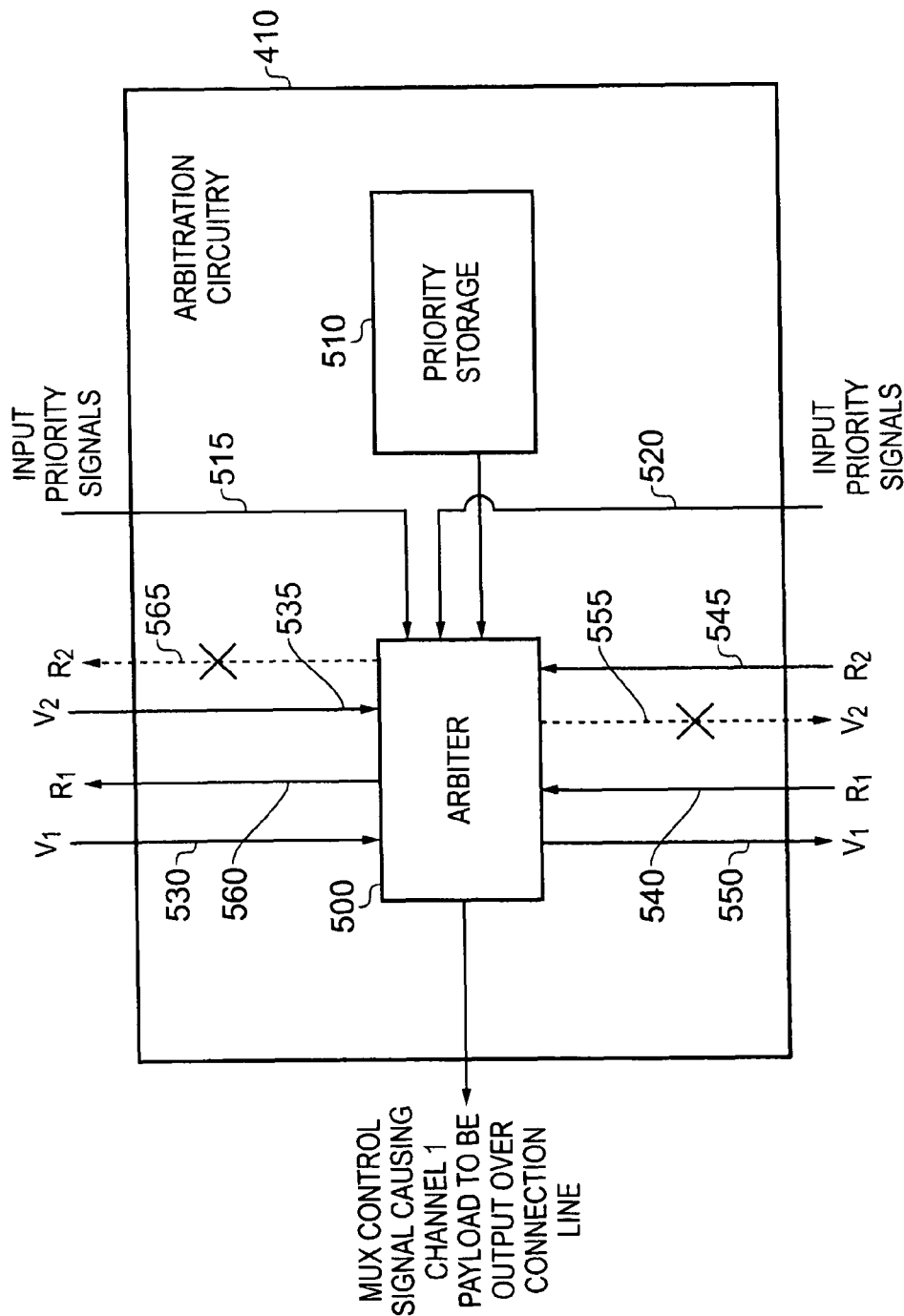

This is illustrated schematically in FIG. 10B, where in this instance it is assumed that the result of the arbitration operation performed by the arbiter 500 is that it is decided to grant access to the associated connection line to channel 1. As a result, a mux control signal is output from the arbiter to cause the payload of channel 1 to be output over the associated connection line. Further, the asserted valid signal over path 530 is propagated on over path 550 and the asserted ready signal over path 540 is propagated on over path 560. This will cause the initiator of the payload data for channel 1 to observe that the transfer has taken place, and will cause the recipient of the payload data for channel 1 to view the payload data it receives as valid. In contrast, for channel 2, the valid signal received over path 535 is not propagated on over path 555 and the ready signal received over path 545 is not propagated on over path 565. If the source of the payload data for channel 2 has asserted a valid signal, this will have the effect that it will continue to output the payload data and continue to hold the valid signal asserted until such time as the arbiter 500 grants access to channel 2. Meanwhile, the recipient for the channel 2 payload data will not see any asserted valid signal, and accordingly will ignore any data appearing on its payload path until such time as the arbiter 500 grants access to the connection line to channel 2, at which point the valid and ready signals associated with channel 2 will be propagated on.

As shown in both FIGS. 10A and 10B, a priority storage 510 may be provided in association with the arbitration circuitry to provide priority information used by the arbiter when deciding which channel to grant access to the connection line in the event that the valid/ready pairs for multiple channels are asserted at the same time. The data in the priority storage 510 may be fixed or may be programmable. Further, the priority storage may be provided internally to the arbitration circuitry or externally for reference by the arbitration circuitry.

It will be appreciated that a variety of priority schemes could be encoded within the priority storage 510. For example, a round-robin scheme may be encoded within the priority storage to ensure an even access to the connection line over time by the various channels associated with that connection line. Alternatively, the priority information may encode that one of the channels should be given higher priority than another of the channels, that transactions of certain types should be treated as higher priority than other transactions, that transfers of certain types should be treated as higher priority (e.g. to give address transfers higher priority than data transfers), etc.

In addition, or as an alternative, priority signals may be input over paths 515, 520 from the first crossbar circuit 15 or the second crossbar circuit 35. This enables priority information to be specified on a transaction-by-transaction basis. For example, a master may identify that a particular transaction should be treated as high priority, a slave device may give an indication of how busy it is, which could be used to influence the priority determination, etc. For example, in the presence of two asserted transactions, if one of those transactions needs to be serviced by a slave device that has indicated that it is currently heavily loaded, it may be appropriate to treat the other transaction as having a higher priority. As another example, if there is a burst of read or write data, the arbitration circuitry may choose to transfer the entire burst instead of simply one beat. As a yet further example, quality of service mechanisms may indicate that certain transactions require high priority in order to guarantee a desired quality of service to a master or a slave.

Figure 11:
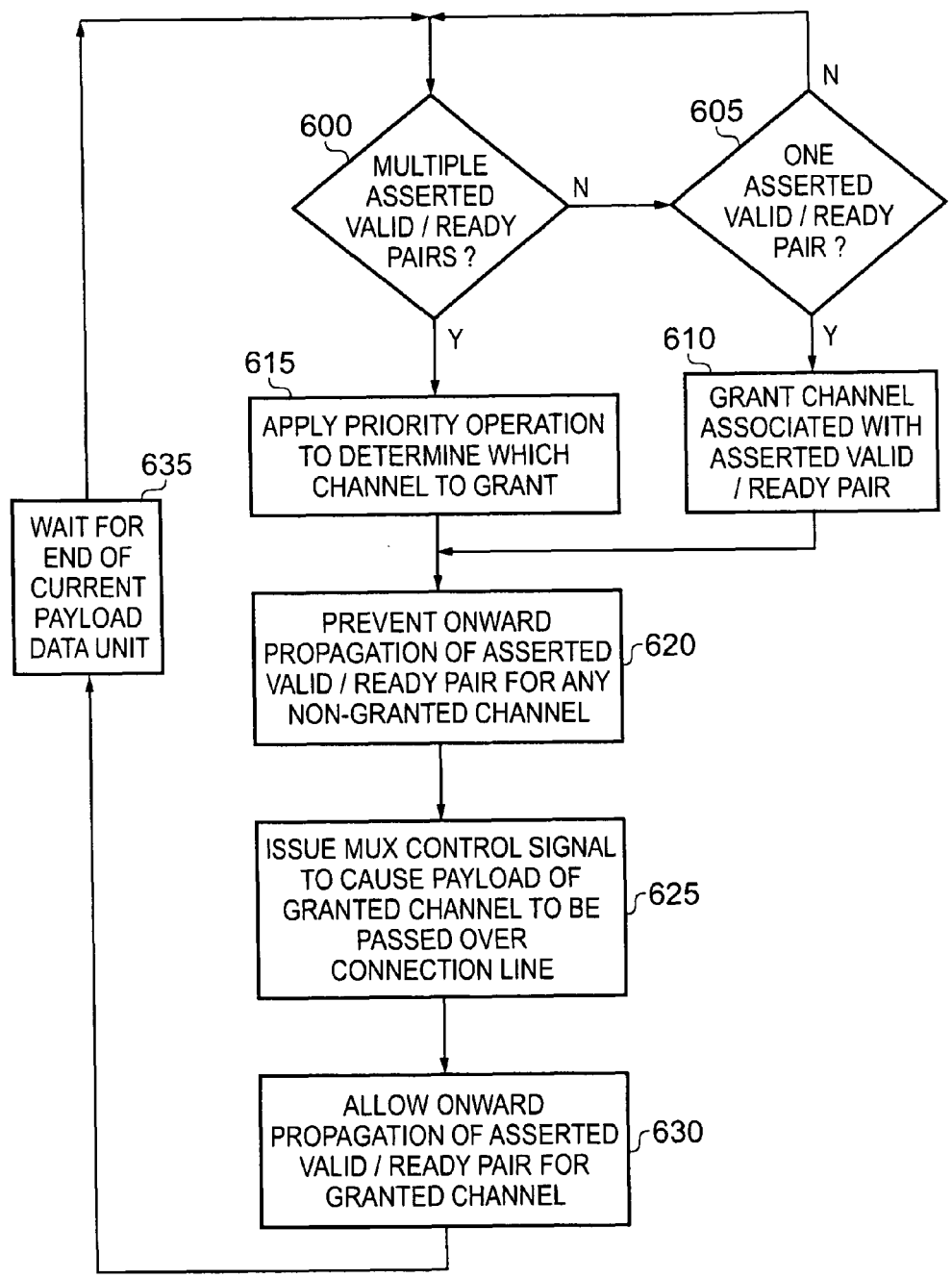
FIG. 11 is a flow diagram illustrating the operation of the arbitration circuits of FIG. 9.

FIG. 11 is a flow diagram illustrating the operation of the arbitration circuitry of FIG. 10A in accordance with one embodiment. At step 600, the arbiter 500 determines whether there are multiple asserted valid/ready pairs. If not, then it is determined whether there is one asserted valid/ready pair at step 605. If not, the process returns to step 600, but if it is determined at step 605 that there is a valid/ready pair asserted, then the channel associated with that asserted valid/ready pair is granted access to the associated connection line at step 610.

If at step 600 it was determined that there were multiple asserted valid/ready pairs, then at step 615 a priority operation is applied to determine which channel to grant access to the connection line. Following either step 610 or step 615, the process proceeds to step 620, where the onward propagation of asserted valid/ready pairs for any non-granted channel is prevented.

At step 625, a mux control signal is issued to cause the payload of the granted channel to be passed over the connection line, and at step 630 the onward propagation of asserted valid/ready pair signals for the granted channel is permitted, thereby enabling the initiator of the payload data that is now being passed over the connection line to recognise the completion of that transfer, and the destination for that payload data to read that payload data from the payload path.

Whilst steps 620, 625 and 630 are shown sequentially, it will be appreciated that in practice two or all of those steps may be performed in parallel.

Following step 630, the end of the current payload data unit is awaited at step 635, before the process returns to step 600. The size of each payload data unit will vary dependent on embodiment. For example, in one embodiment, payload data is transferred in beats, with one beat being transferred per clock cycle. Accordingly, in one embodiment a payload data unit may be considered to be a data beat, but in alternative embodiments the payload data unit could be considered to be an entire packet of data, consisting of multiple beats. The chosen granularity for the payload data unit will determine how often the arbitration circuitry 410 re-performs its arbitration.

In the above example it is assumed that the first and second switching circuitry separated by the bidirectional link are both single crossbar circuits, each coupled to one or more masters and one or more slaves. However, in other embodiments more complex structures for the first and second switching circuits can be used.

Figure 12:
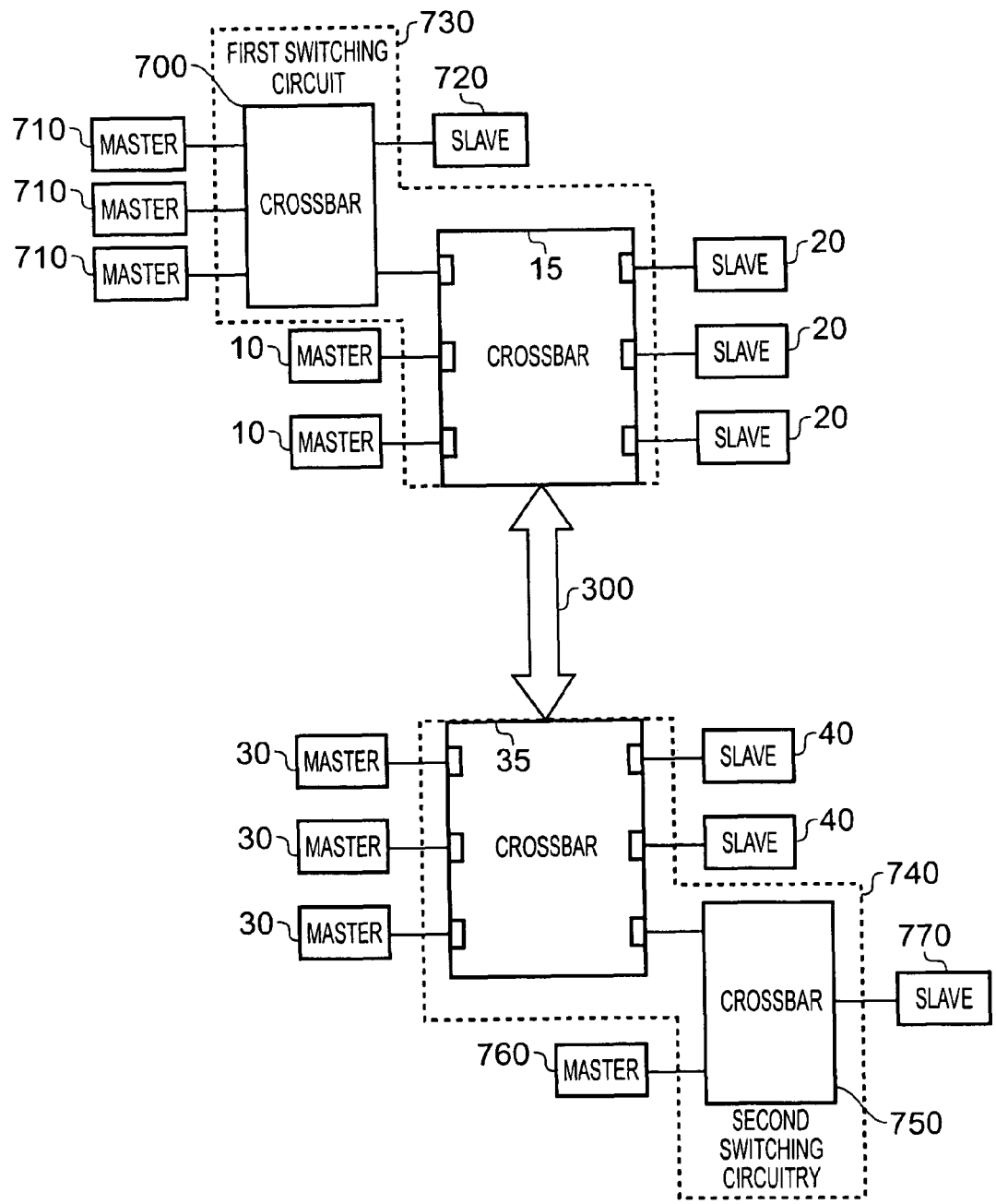
FIG. 12 is a diagram illustrating how additional crossbar circuits can be added to the communication infrastructure of FIG. 5 in accordance with one embodiment, in order to form more complex first and second switching circuitry.

For example, FIG. 12 is a diagram schematically illustrating how further crossbar circuits can be connected to the communication infrastructure discussed earlier with reference to FIG. 5, to form more complex first and second switching circuits. Those elements that are the same as discussed earlier with reference to FIG. 5 are identified by the same reference numerals. In this example, a further crossbar circuit 700 is connected to a slave interface of the first crossbar 15 and a further crossbar circuit 750 is connected to a master interface of the second crossbar 35. The crossbar circuits 15 and 700 collectively form the first switching circuitry 730, whilst the crossbar circuits 35 and 750 collectively form the second switching circuitry 740. The bidirectional link 300 will be used whenever a transaction is initiated by a master on one side of the bidirectional link to a slave on the other side of the bidirectional link. Hence, in addition to a master 10 communicating with a slave 40, or a master 30 communicating with a slave 20, it is also possible for a master 710 to communicate with a slave 40 via the bidirectional link, or indeed for a master 710 or a master 10 to communicate with a slave 770 connected to the further crossbar 750. In any of these events, the transfer of data across the bidirectional link occurs using the mechanisms discussed earlier with reference to FIGS. 5 to 11.

Figure 13A:
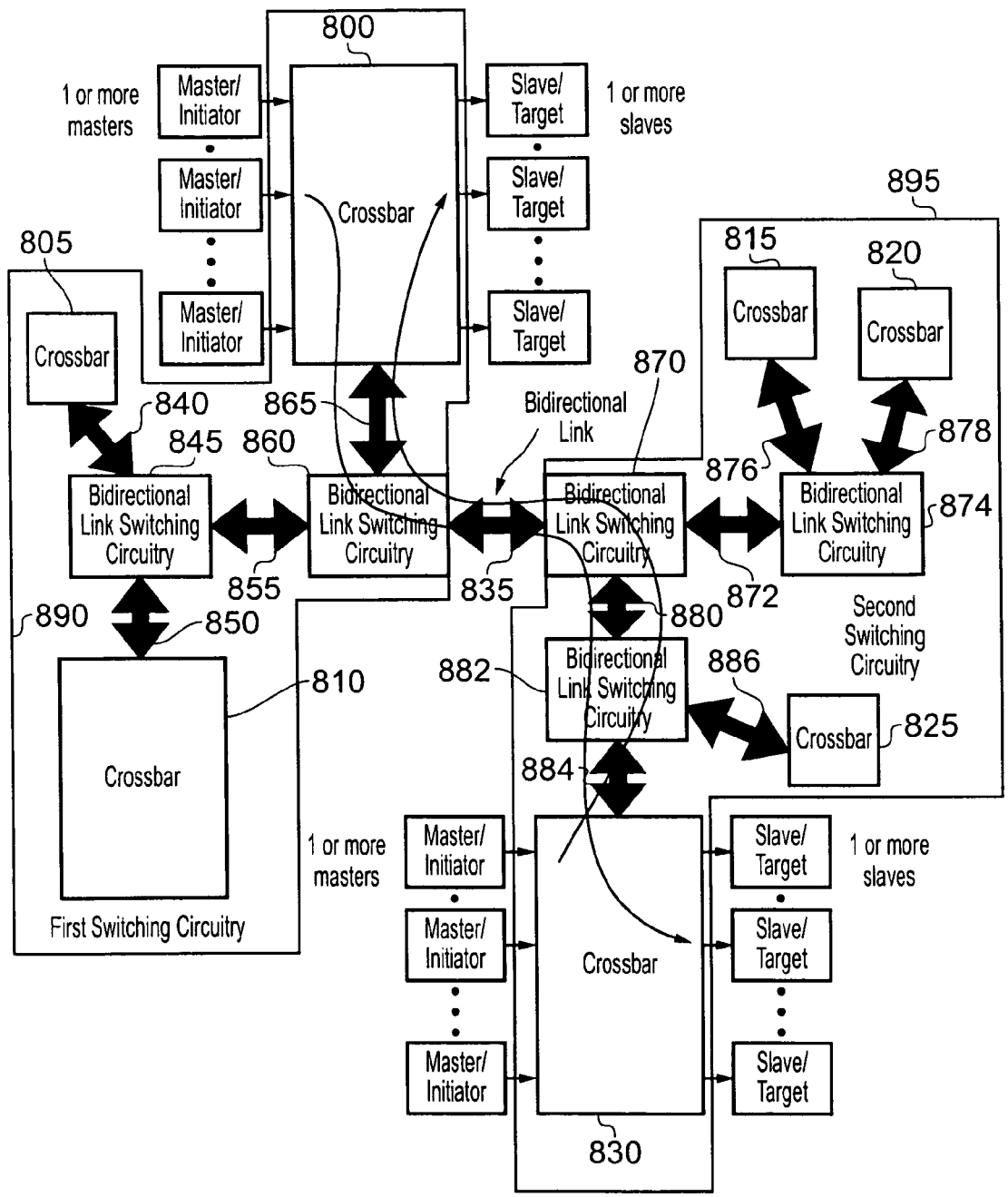
FIGS. 13A and 13B are diagrams illustrating communication infrastructures including complex first and second switching circuitry, in accordance with alternative embodiments.

FIG. 13A illustrates a further alternative embodiment where a more complex arrangement of first and second switching circuitry is envisaged. In this example first switching circuitry 890 is interconnected with second switching circuitry 895 via a bidirectional link 835. The first switching circuitry comprises a plurality of separate crossbars 800, 805, 810 interconnected by bidirectional links 840, 850, 855, 865 with the bidirectional links being connected together via bidirectional link switching circuitry 845, 860 that serve to route communications between the relevant bidirectional links to ensure traffic is routed as appropriate having regard to the initiating master and target slave for each transaction.

Similarly the second switching circuitry 895 comprises a plurality of separate crossbars 815, 820, 825, 830 interconnected by bidirectional links 872, 876, 878, 880, 884, 886 with the bidirectional links being connected together via bidirectional link switching circuitry 870, 874, 882.

Each of the first and second switching circuits 890, 895 are coupled to a plurality of masters and a plurality of slaves, with the bidirectional link 835 allowing communication between a master connected to the first switching circuitry 890 and a slave connected the second switching circuitry 895, and allowing communication between a master connected to the second switching circuitry 895 and a slave connected the first switching circuitry 890.

Each of the bidirectional links operate in an analogous manner, and hence it will be appreciated that in an embodiment such as FIG. 13A, the interpretation of which elements are in the first switching circuitry and which elements are in the second switching circuitry can change dependent on which bidirectional link is being considered at the time. Purely by way of example, if we consider bidirectional link 865, the first switching circuitry comprises the crossbar 800, and all remaining crossbars, bidirectional links and bidirectional link switching circuitry are provided within the second switching circuitry.

Figure 13B:
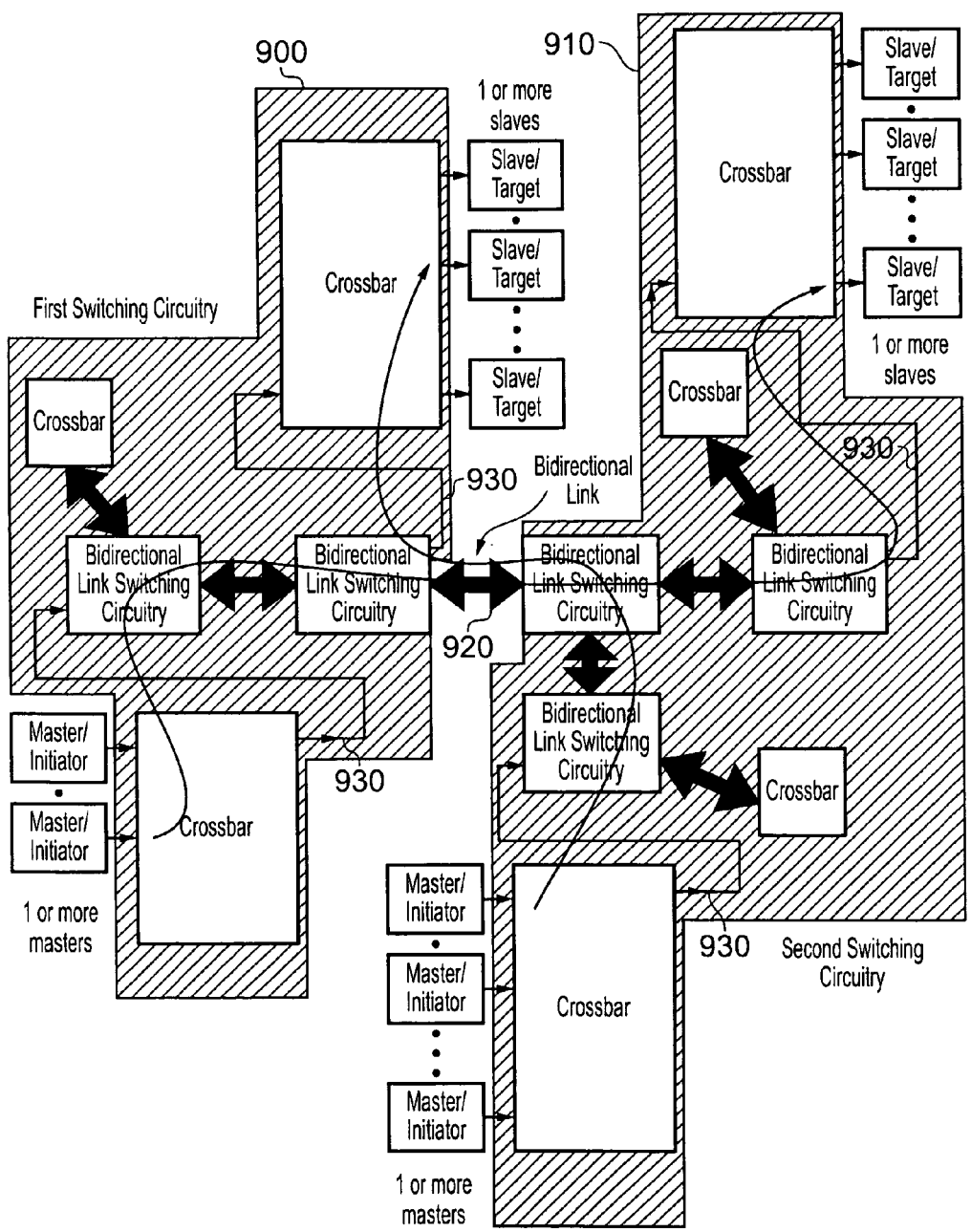

FIG. 13B illustrates a further alternative embodiment where the first switching circuitry 900 is interconnected to the second switching circuitry 910 by the bidirectional link 920. In this example, it can be seen that each individual crossbar does not need to support both master and slaves, but both the first switching circuitry 900 and the second switching circuitry 910 have both masters and slaves connected thereto, therefore requiring the bidirectional link 920 between them to allow masters on one side of the bidirectional link to communicate with slaves on the other. For those crossbars with only one of masters or slaves connected thereto, they do not require a bidirectional link in order for them to be connected to other components in the communication infrastructure, and instead the unidirectional links 930 can be used.

As will be apparent from the above description of embodiments, such embodiments allow an efficient interconnection between two crossbar circuits using a bidirectional link, where the number of connection lines required to form the bidirectional link is significantly reduced, whilst avoiding the need for protocol conversion, and preserving the handshaking signals of the multi-channel communication protocol used by the crossbar circuit. The choices to which channels are multiplexed can be made so as to permit balancing of bandwidth requirements, and also to avoid deadlock issues in some circumstances. Further, by reducing the number of connection lines required in the bidirectional link, power consumption reductions can be achieved (due to the overall reduction in logic that is needed).

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A communication infrastructure for a data processing apparatus, comprising:

first switching circuitry for coupling to at least one first master interface and at least one first slave interface;

second switching circuitry for coupling to at least one second master interface and at least one second slave interface;

said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels;

a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and control circuitry for multiplexing at least one forward channel of the first communication path and at least one reverse channel of the second communication path, such that the 2m channels formed by the first and second communication paths are provided by the n connection lines of the bidirectional link, the control circuitry being arranged to perform said multiplexing in dependence on the handshaking signals associated with the channels to be multiplexed, wherein for each connection line of the bidirectional link onto which multiple channels are to be multiplexed, the control circuitry comprises:

multiplexer circuitry for multiplexing payload data from each of the multiple channels to be multiplexed; and arbitration circuitry for controlling the multiplexer circuitry in dependence on the handshaking signals associated with the multiple channels to be multiplexed;

whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

2. A communication infrastructure as claimed in claim 1, wherein the control circuitry is further arranged to multiplex at least one reverse channel of the first communication path and at least one forward channel of the second communication path.

3. A communication infrastructure as claimed in claim 1, wherein the initiating master interface is one of said at least one first master interface and the target slave interface is one of said at least one second slave interface, and the first communication path of said bidirectional link forms part of the communication path from the initiating master interface to the target slave interface.

4. A communication infrastructure as claimed in claim 1, wherein the initiating master interface is one of said at least one second master interface and the target slave interface is one of said at least one first slave interface, and the second communication path of said bidirectional link forms part of the communication path from the initiating master interface to the target slave interface.

5. A communication infrastructure as claimed in claim 1, wherein for each channel the arbitration circuitry receives a first handshaking signal from the first switching circuitry and a second handshaking signal from the second switching circuitry, both the first handshaking signal and the second handshaking signal needing to be asserted for a channel to enable the arbitration circuitry to output the payload data of that channel onto the associated connection line of the bidirectional link.

6. A communication infrastructure as claimed in claim 5, wherein if the first and second handshaking signals for at least two of the multiple channels to be multiplexed are asserted, the arbitration circuitry applies a prioritisation operation in order to determine for which of those at least two channels the payload data will be output over the associated connection line.

7. A communication infrastructure as claimed in claim 6, wherein the arbitration circuitry prevents onward propagation of asserted handshaking signals between the first switching circuitry and the second switching circuitry for any channel other than that channel whose payload data is currently being output over the associated connection line.

8. A communication infrastructure as claimed in claim 7, wherein at an output end of each connection line of the bidirectional link onto which multiple channels are multiplexed, the payload data output over that connection line is output on each of the multiple channels multiplexed onto that connection line, the payload data only being considered valid by that channel whose asserted handshaking signals have been propagated by the arbitration circuitry.

9. A communication infrastructure as claimed in claim 6, further comprising a priority storage for storing predetermined priority data referenced by the arbitration circuitry when performing said prioritisation operation.

10. A communication infrastructure as claimed in claim 6, wherein the arbitration circuitry is arranged to receive one or more input priority signals which vary dependent on the transactions currently being handled by the communication infrastructure, and to reference the one or more input priority signals when performing the prioritisation operation.

11. A communication infrastructure for a data processing apparatus, comprising:
first switching circuitry for coupling to at least one first master interface and at least one first slave interface;
second switching circuitry for coupling to at least one second master interface and at least one second slave interface;
said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels, wherein each channel has payload data and associated handshaking signals, the handshaking signals comprising a valid signal passed over the channel in the same direction as the payload data, and a ready signal passed over the channel in an opposite direction to the payload data and the valid signal;
a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and
control circuitry for multiplexing at least one forward channel of the first communication path and at least one reverse channel of the second communication path, such that the 2m channels formed by the first and second communication paths are provided by the n connection lines of the bidirectional link, the control circuitry being arranged to perform said multiplexing in dependence on the handshaking signals associated with the channels to be multiplexed;
whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

12. A communication infrastructure for a data processing apparatus, comprising:
first switching circuitry for coupling to at least one first master interface and at least one first slave interface;
second switching circuitry for coupling to at least one second master interface and at least one second slave interface;
said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels;

a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and control circuitry for multiplexing at least one forward channel of the first communication path and at least one reverse channel of the second communication path, such that the 2m channels formed by the first and second communication paths are provided by the n connection lines of the bidirectional link, the control circuitry being arranged to perform said multiplexing in dependence on the handshaking signals associated with the channels to be multiplexed, wherein the channels of said 2m channels that are multiplexed, and the connection lines that those channels are multiplexed onto, are chosen having regard to one or more predetermined criteria;

whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

13. A communication infrastructure as claimed in claim 12, wherein the one or more predetermined criteria ensure that a plurality of highly utilised channels are provided on different connection lines of the bidirectional link.

14. A communication infrastructure as claimed in claim 13, wherein said plurality of highly utilised channels comprise a write data channel and a read data channel.

15. A communication infrastructure as claimed in claim 12, wherein the one or more predetermined criteria ensure that a plurality of address channels are provided on different connection lines of the bidirectional link.

16. A communication infrastructure as claimed in claim 12, wherein the one or more predetermined criteria ensure that read address channels are not multiplexed with write data channels.

17. A communication infrastructure for a data processing apparatus, comprising:

first switching circuitry for coupling to at least one first master interface and at least one first slave interface;

second switching circuitry for coupling to at least one second master interface and at least one second slave interface;

said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels, wherein the m channels of each of the first and second communication paths comprise a read address channel, a read data channel, a write address channel, a write data channel, and a write response channel;

a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and control circuitry for multiplexing:
(a) the write address and write data channels of the first communications path;
(b) the write address and write data channels of the second communications path;
(c) the read data and write response channels of the first communications path and the read address channel of the second communications path;
(d) the read data and write response channels of the second communications path and the read address channel of the first communications path such that the 2m channels formed by the first and second communication paths are provided by the n connection lines of the bidirectional link, the control circuitry being arranged to perform said multiplexing in dependence on the handshaking signals associated with the channels to be multiplexed;

whereby the 10 channels provided by the first and second communication paths are provided by four connection lines of the bidirectional link, whereby the four connection lines of the bidirectional link are employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

18. A communication infrastructure for a data processing apparatus, comprising:

first switching circuitry for coupling to at least one first master interface and at least one first slave interface;

second switching circuitry for coupling to at least one second master interface and at least one second slave interface;

said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels;

a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and control circuitry for multiplexing at least one forward channel of the first communication path and at least one reverse channel of the second communication path, such that the 2m channels formed by the first and second communication paths are provided by the n connection lines of the bidirectional link, the control circuitry being arranged to perform said multiplexing in dependence on the handshaking signals associated with the channels to be multiplexed;

whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface, wherein the multi-channel communication protocol employed by the first switching circuitry is the same as the multi-channel communication protocol employed by the second switching circuitry, wherein the multi-channel communication protocol is an AXI protocol providing 5 channels per communication path, and the number n of connection lines within the bidirectional link is less than 10.

19. A communication infrastructure for a data processing apparatus comprising:

first switching circuitry for coupling to at least one first master interface and at least one first slave interface;

second switching circuitry for coupling to at least one second master interface and at least one second slave interface;

said first switching circuitry and said second switching circuitry employing a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the in channels;

a bidirectional link interconnecting said first switching circuitry and said second switching circuitry, the bidirectional link comprising a plurality n of connection lines, where n is less than 2m, the bidirectional link supporting a first communication path from the first switching circuitry to the second switching circuitry, and a second communication path in an opposite direction from the second switching circuitry to the first switching circuitry, both the first communication path and the second communication path providing said m channels; and control circuitry for multiplexing at least one forward channel of the first communication path and at least one reverse channel of the second communication path, such that the 2m channels formed by the first and second communication paths are provided by the n connection lines of the bidirectional link, the control circuitry being arranged to perform said multiplexing in dependence on the handshaking signals associated with the channels to be multiplexed;

whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface, wherein:

the first switching circuitry has a plurality of first internal master interfaces and a plurality of first internal slave interfaces;

the second switching circuitry has a plurality of second internal master interfaces and a plurality of second internal slave interfaces;

the bidirectional link is connected to one of said first internal master interfaces, one of said first internal slave interfaces, one of said second internal master interfaces and one of said second internal slave interfaces;

the first communication path passes from said one of the first internal master interfaces to said one of the second internal slave interfaces to form part of the communication path established when the initiating master interface is coupled to the first switching circuitry and the target slave interface is coupled to the second switching circuitry; and the second communication path passes from said one of the second internal master interfaces to said one of the first internal slave interfaces to form part of the communication path established when the initiating master interface is coupled to the second switching circuitry and the target slave interface is coupled to the first switching circuitry.

20. A method of operating a communication infrastructure for a data processing apparatus, the communication infrastructure comprising first switching circuitry for coupling to at least one first master interface and at least one first slave interface, second switching circuitry for coupling to at least one second master interface and at least one second slave interface, and a bidirectional link interconnecting said first switching circuitry and said second switching circuitry, the method comprising the steps of:

employing within said first switching circuitry and said second switching circuitry a multi-channel communication protocol, whereby on initiation of a transaction from an initiating master interface to a target slave interface for the transaction, a communication path is established from said initiating master interface to said target slave interface, the communication path comprising m channels, said m channels comprising one or more forward channels from said initiating master interface to said target slave interface and one or more reverse channels from said target slave interface to said initiating master interface, and handshaking signals being associated with each of the m channels;

providing a plurality n of connection lines within the bidirectional link, where n is less than 2m;

arranging the bidirectional link to support a first communication path from the first switching circuitry to the second switching circuitry, and a second communication path in an opposite direction from the second switching circuitry to the first switching circuitry, both the first communication path and the second communication path providing said m channels; and multiplexing at least one forward channel of the first communication path and at least one reverse channel of the second communication path, such that the 2m channels formed by the first and second communication paths are provided by the n connection lines of the bidirectional link, said multiplexing being performed in dependence on the handshaking signals associated with the channels to be multiplexed, wherein the channels of said 2m channels that are multiplexed, and the connection lines that those channels are multiplexed onto, are chosen having regard to one or more predetermined criteria;

whereby the bidirectional link is employed to form at least part of the communication path for any transaction where the initiating master interface is one of said at least one first master interface and the target slave interface is one of said at least one second slave interface, or for any transaction where the initiating master interface is one of said at least one second master interface and the target slave interface is one of said at least one first slave interface.

21. A communication infrastructure for a data processing apparatus, comprising:

first switching means for coupling to at least one first master interface means and at least one first slave interface means;

second switching means for coupling to at least one second master interface means and at least one second slave interface means;

said first switching means and said second switching means for employing a multi-channel communication protocol, whereby on initiation of a transaction from an initiating master interface means to a target slave interface means for the transaction, a communication path is established from said initiating master interface means to said target slave interface means, the communication path comprising m channels, said m channels comprising one or more forward channels from said initiating master interface means to said target slave interface means and one or more reverse channels from said target slave interface means to said initiating master interface means, and handshaking signals being associated with each of the m channels;

a bidirectional link means for interconnecting said first switching means and said second switching means, the bidirectional link means comprising a plurality n of connection lines, where n is less than 2m, the bidirectional link means for supporting a first communication path from the first switching means to the second switching means, and a second communication path in an opposite direction from the second switching means to the first switching means, both the first communication path and the second communication path providing said m channels; and control means for multiplexing at least one forward channel of the first communication path and at least one reverse channel of the second communication path, such that the 2m channels formed by the first and second communication paths are provided by the n connection lines of the bidirectional link means, the control means for performing said multiplexing in dependence on the handshaking signals associated with the channels to be multiplexed, wherein for each connection line of the bidirectional link means onto which multiple channels are to be multiplexed, the control means comprises:

multiplexer means for multiplexing payload data from each of the multiple channels to be multiplexed; and arbitration means for controlling the multiplexer means in dependence on the handshaking signals associated with the multiple channels to be multiplexed;

whereby the bidirectional link means is employed for forming at least part of the communication path for any transaction where the initiating master-interface means is one of said at least one first master interface means and the target slave interface means is one of said at least one second slave interface means, or for any transaction where the initiating master interface means is one of said at least one second master interface means and the target slave interface means is one of said at least one first slave interface means.

* * * * *